US011026108B2

(12) United States Patent
Blake et al.

(10) Patent No.: US 11,026,108 B2
(45) Date of Patent: Jun. 1, 2021

(54) FAULT MONITORING IN A UTILITY SUPPLY NETWORK

(71) Applicant: SPATIALBUZZ LIMITED, Guildford (GB)

(72) Inventors: Andrew Blake, Guildford (GB); Michael Shannon, Redhill (GB)

(73) Assignee: SPATIALBUZZ LIMITED, Guildford (GB)

(*) Notice: Subject to any disclaimer, the term of this patent is extended or adjusted under 35 U.S.C. 154(b) by 0 days.

(21) Appl. No.: 16/630,207

(22) PCT Filed: Jul. 6, 2018

(86) PCT No.: PCT/GB2018/051926
§ 371 (c)(1),
(2) Date: Jan. 10, 2020

(87) PCT Pub. No.: WO2019/012255
PCT Pub. Date: Jan. 17, 2019

(65) Prior Publication Data
US 2020/0162950 A1    May 21, 2020

(30) Foreign Application Priority Data

Jul. 11, 2017 (GB) ..................................... 1711159

(51) Int. Cl.
*H04W 24/08* (2009.01)
*H04W 84/04* (2009.01)
(52) U.S. Cl.
CPC .......... *H04W 24/08* (2013.01); *H04W 84/042* (2013.01)

(58) Field of Classification Search
CPC .... H04W 24/08; H04W 84/042; H04L 43/08; H04L 43/16; H04L 43/0876
See application file for complete search history.

(56) References Cited

U.S. PATENT DOCUMENTS

| | | | |
|---|---|---|---|
| 2002/0083168 A1* | 6/2002 | Sweeney ............. | G06F 11/3466 709/224 |
| 2003/0101357 A1* | 5/2003 | Ronen ................. | H04L 63/0272 726/23 |
| 2010/0262689 A1* | 10/2010 | Ungermann ...... | H04L 12/40032 709/224 |

(Continued)

FOREIGN PATENT DOCUMENTS

EP    3 089 505 A1    11/2016
JP    2006229421 A    8/2006
(Continued)

OTHER PUBLICATIONS

Agrawal R et al: "Fast Algorithms for Mining Association Rules", Proceedings of the International Conference on Very Largedata Bases, Jan. 1, 1994 (Jan. 1, 1994), pp. 487-499, XP000671665, chapter 2.

(Continued)

*Primary Examiner* — Dinh Nguyen
(74) *Attorney, Agent, or Firm* — Dinsmore & Shohl LLP

(57) ABSTRACT

Where elements in a utility supply network are dependent upon another element for their proper operation, determining, by reference to user queries about network performance, whether there are faults in the dependent elements or a fault in the element upon which the dependent elements rely.

18 Claims, 15 Drawing Sheets

(56) References Cited

U.S. PATENT DOCUMENTS

| | | | | |
|---|---|---|---|---|
| 2012/0033544 A1* | 2/2012 | Kung | ................... | H04L 41/0604 |
| | | | | 370/221 |
| 2014/0195845 A1* | 7/2014 | Phan | ................... | G06F 11/0793 |
| | | | | 714/2 |
| 2017/0139795 A1* | 5/2017 | Komano | ................... | H04L 63/08 |
| 2018/0295013 A1* | 10/2018 | Deb | ................... | G06F 16/24522 |

FOREIGN PATENT DOCUMENTS

| | | | |
|---|---|---|---|
| JP | 2009135731 A | 6/2009 | |
| JP | 2014138403 A | 7/2014 | |
| WO | 2013163429 A1 | 10/2013 | |
| WO | 2016148840 A1 | 9/2016 | |
| WO | 2017050621 A1 | 3/2017 | |

OTHER PUBLICATIONS

International Search Report and Written Opinion for International Patent Application PCT/GB2018/051926 dated Jan. 1, 2019, 13 pages.

Patents Act 1977: Search Report under Section 17 for Application No. GB1711159.2 dated Dec. 6, 2017, 1 page.

\* cited by examiner

FAULT MONITORING IN A UTILITY SUPPLY NETWORK

CROSS REFERENCE TO RELATED APPLICATIONS

The present application is a National Phase Entry of International Application No. PCT/GB2018/051926, entitled "FAULT MONITORING IN A UTILITY SUPPLY NETWORK" and filed on Jul. 6, 2018, which claims priority to Great Britain Application No. 1711159.2, filed Jul. 11, 2017 and entitled "Fault Monitoring in a Utility Supply Network," both of which are incorporated by reference herein in their respective entireties.

FIELD OF THE INVENTION

The invention relates to the management of faults in a utility supply network, such as a cellular communications network. Management of faults may extend to one or more of identifying the type of fault that has arisen, identifying the location of the fault within the network and determining the expected time to repair the fault, and to signalling the results of one or more of these actions.

BACKGROUND

Faults occur in utility supply networks, as in all other complex technical systems. In the context of a cellular, or mobile, network, such faults include the failure of hardware components in the base-stations of the mobile network, failures in other systems which are connected to multiple base-stations (for example the radio network controller—RNC—in a 3G system and which then result in the loss of operation of large sections of the network—e.g. all node B base-stations connected to the RNC) and failures to switching and other more centralised functions, which again would impact multiple areas of the network simultaneously.

When such failures occur, it is important to identify them as quickly as possible, both so that maintenance teams can be dispatched to repair the fault and restore service to the customers of the network and also to enable these same customers to be kept informed about the fact that a failure has occurred (hence relieving customer anxiety that their mobile device may be at fault) and also about the progress of a repair and the likely time at which service will be restored. Such information on service failures and repair progress may be provided by a customer service operative on a 'helpline' provided by the network operator or via a web-page, mobile phone 'app' or other similar interface available to the end user of the network services.

In other situations, network services may be suspended in order to carry out planned maintenance or upgrades to the network. In such circumstances, the elements of the network (e.g. base-station or stations) which will be affected are known in advance and the duration of the service outage can also be estimated with a reasonable degree of certainty.

In still other situations, poor service may occur as a result of congestion on the network—too many users attempting to make use of too many of the network's resources, simultaneously. Such situations can occur, for example, during rush hour at a busy train station or around the time of an irregular event, such as a sports match or music concert, at a particular location.

At present, operators rely upon a disparate array of systems for managing and reporting faults, planned network outages, progress updates for repairs which are underway and the identification and location of congestion events and other aspects which impact a customer's experience of a mobile operator's network. For a customer, however, all of the above causes result in a single outcome: poor (or no) mobile service. Reporting to customers the fact that such issues are known (or not, which may indicate a problem with the user's mobile device) and when they are likely to be resolved, is becoming increasingly important, in the quest to retain customers and reduce customer 'churn' (customers moving from one service provider to another).

As mentioned above, it may be the case that, within a utility supply network, the proper functioning of certain equipment is dependent upon the correction operation of other equipment. The example given earlier was the dependency of node-B base stations upon the proper operation of their controlling RNC. Therefore, it is useful in a utility supply network to be able to confidently and correctly attribute problems to equipment (such as an RNC) upon which other equipment relies in order to deliver the utility or service.

SUMMARY OF THE INVENTION

According to one aspect, the invention provides a method of fault monitoring in a utility supply network. The network contains multiple elements necessary for delivery of the utility. Amongst the elements, there is a first parent element upon which a first plurality of child elements depend in order to perform properly. Failure indications are received, each failure indication attributed to a particular child element and indicating failure of an element in the network. As a first total, the number of failure indications that have been received for the child elements of the first plurality is counted. It is determined whether the first total exceeds a first threshold. Upon determining that the first total exceeds the first threshold, the number of child elements of the first plurality that satisfy a likelihood condition is counted as a second total and it is determined whether the second total exceeds the second threshold. Upon determining that the second total exceeds the second threshold, it is signalled that the first parent element is likely impaired. For each child element, the likelihood condition is the count of the failure indications that are attributed to that child element exceeding a limit assigned to that child element.

The invention thus provides a way of assessing whether a parent element is faulty, the assessment requiring multiple conditions to be satisfied, such that the reliability of the assessment is potentially enhanced.

In some embodiments, determining whether the second total exceeds the second threshold involves assessing whether more than a certain fraction or percentage of the child elements satisfy their likelihood conditions.

In some embodiments, a second parent element in the network is assessed. A second plurality of child elements depend on the second parent element in order to perform properly. The number of failure indications that have been received for the child elements of the second plurality is counted as a third total. It is determined whether the third total exceeds a third threshold. Upon determining that the third total exceeds the third threshold, the number of child elements of the second plurality that satisfy a likelihood condition is counted as a fourth total and it is determined whether the fourth total exceeds a fourth threshold. Upon determining that the fourth total exceeds the fourth threshold, it is signalled that the second parent element is likely impaired. For each child element of the second plurality, the likelihood condition is the count of the failure indications that are attributed to that child element exceeding a limit assigned to that child element.

In some embodiments, one or some of the child elements are common to the first and second pluralities of child elements.

In some embodiments, some or all of the likelihood conditions are the same.

In some embodiments, at least one failure indication is a query from a user about unsatisfactory network performance.

In some embodiments, a query from a user is attributed to a particular child element at least in part by estimating that the user relied on that child element when receiving the unsatisfactory network performance.

In some embodiments, a query from a user is attributed to a particular child element at least in part by estimating that the user should have relied on that child element when receiving the unsatisfactory network performance.

In some embodiments, a query from a user is attributed to a particular child element at least in part by estimating that the user was located within a predicted, measured or estimated coverage area of that child element when receiving the unsatisfactory network performance.

In some embodiments, a query from a user is attributed to a particular child element at least in part by reviewing logged information to establish that the user relied on that child element when receiving the unsatisfactory network performance.

In some embodiments, at least one failure indication is an alarm signal from an alarm configured to detect a problem at the respective child element.

From another perspective, the invention can also be implemented as apparatus for performing a method of one the types discussed above, or as a program for causing data processing equipment to perform a method of one the types discussed above.

In some embodiments, the utility supply network is a mobile telecommunications network. In such a case, at least one child element can be a base station. In the case where the utility supply network is a mobile telecommunications network, a parent element could be, for example, a controller for a group of base stations or a part of the backhaul of the network (such as a microwave link or a fibre-optic cable). In other embodiments, the utility supply network is something other than a mobile telecommunications network, such as gas, water or electricity supply network, or an internet access or cable television network.

BRIEF DESCRIPTION OF THE FIGURES

By way of example only, certain embodiments of the invention will now be described by reference to the accompanying drawings, in which.

DETAILED DESCRIPTION

Figure 1:
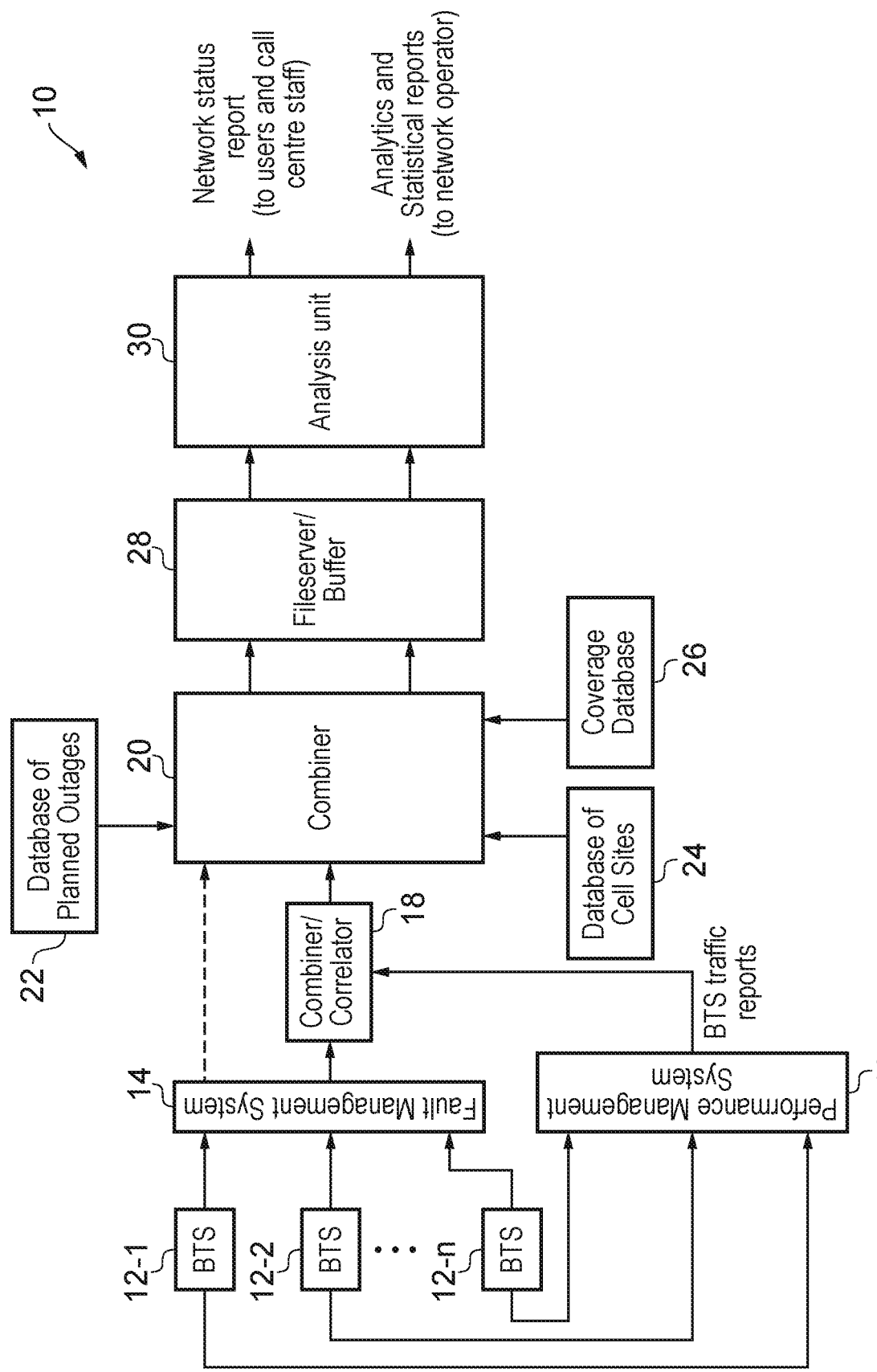
FIG. 1 is a block diagram schematically illustrating the architecture of a network monitoring tool that is connected to a network that is to be monitored.

An outline of the architecture of a network service reporting system (NSRS) 10 for a mobile network is shown in FIG. 1. The NSRS 10 includes a fault management system 14, a performance management system 16, a combiner/correlator 18, a main combiner 20, a database of planned outages 22, a database of cell sites, 24, a coverage database 26, a file server/buffer 28 and an analysis unit 30. The NSRS 10 takes input from n base stations 12-1, 12-2, . . . 12-n of the mobile network that is being monitored. The n base stations may be all of the base stations in the mobile network or just some subset of the base stations in the mobile network.

Each of the blocks 14-30 in the NSRS 10 could be implemented by a physically separate piece of data processing and/or data storage hardware (such as a personal computer, a server, a hard disk storage unit or the like) or some of the blocks could be implemented in a single piece of hardware (e.g. the main combiner 20 and the fileserver/buffer 28 may well be combined within a single piece of hardware). It is also possible that some or all of the hardware that implements blocks 14-30 could be virtualized and be assigned to disparate hardware elements by a third-party service provider, such as a cloud computing services provider. In this case, a 'server' could actually be a virtual server, with tasks executed and spread across a number of physical hardware devices, potentially in different physical locations.

It is possible that the network operator is unaware that there is a problem, based upon the alarm signals or messages that it is receiving from the various network elements. The network service reporting system 10 is capable of distilling from these various, disparate pieces of information provided by the network elements, a single coherent message indicating to the network operator that there is a fault in the network that requires attention.

For example, and assuming that the mobile network being monitored is a 3G network, it is possible for a radio network controller (RNC) to fail. Such a failure would cause the traffic from a large number of base-stations to fail to connect to the remainder of the operator's network (and outside).

The base-stations themselves would still be fully functional and would report no alarm conditions, however the users of the network would experience severe disruption. In this case, the network operator could remain unaware of the problem, until such time as the RNC reported a fault. The reporting of such a fault can be delayed by many hours, for various reasons, with the result that the first indication that a problem might exist is when customer service staff begin to receive a large number of complaints from users. This is clearly a far from ideal way for an operator to learn of faults in its network. Furthermore, there is currently no way for customer service operatives to report, in a meaningful way, where the problems are occurring. The result of this is that an operator knows that a major problem exists, but not where (geographically or within his network equipment) the fault has occurred.

The NSRS 10 also distils from a range of disparate inputs (arising, typically, from disparate physical parts of the mobile network operator's system) a single, coherent message which can easily be understood by both users of the mobile communications system and call centre staff or other customer services staff (e.g. staff located in mobile phone retailers). This message provides an indication as to whether the mobile network is thought by the operator to be operating correctly in a given geographical location (where the user is, currently, or about which the user has submitted a query, perhaps due to an earlier problem). If the user is kept informed about the problem (if it is known) and its resolution, then he/she is less likely to be dissatisfied with the service provided by the network operator and hence less likely to switch to another network operator.

The NSRS 10 is able to provide an informed view of the status of a network, to both an end-user and to customer service personnel and maintenance/operations personnel, within a network operator. The various elements shown in FIG. 1 will now be discussed in more detail.

Base stations 12-1 to 12-n form part of the mobile network that is being monitored. The base stations 12-1 to 12-n are configured to send alarm signals when certain fault conditions are detected, e.g. the voltage of the power supply to the base station drops below a predetermined threshold. The alarm signals from the base stations 12-1 to 12-n are fed to the fault management system 14, which amalgamates the alarm messages and provides amalgamated data on all of the alarms existing within the network at that time. This data can either be passed directly to the main combiner 20 (dashed line) or to the combiner/correlator 18, the function of which will be described below.

The performance management system 16 receives from each base station 12-1 to 12-n information on the amount of traffic being handled and various other performance measures, such as the number of dropped calls, the number of attempted calls which fail to connect, etc. Again, this information is fed to the combiner/correlator 18 (notably the traffic level information, in particular).

The database of planned outages 22 stores all of the planned maintenance operations on the network and which parts of the network will be impacted (e.g. which basestations will be turned off and for how long they are anticipated to be off-air).

The database of cell sites 24 stores the locations of all of the cell sites (or base station sites) in the network, together with information about each site (e.g. transmit power level capability, antenna pointing directions and down-tilt angles, etc.). There are frequently errors in this database, such as occur when antenna feeder cables have been (inadvertently) swapped during the installation of the base station, meaning that the antenna pointing directions are recorded, in a typical tri-sector example, 120 degrees in error.

The coverage database 26 is typically provided, either directly or indirectly, from a network planning tool. In some instances, it is provided by a networking planning tool and then stored and updated separately, while, in other cases, it is provided directly as a part of a network planning tool's own database. The entries in the coverage database 26 may be modified as a result of drive testing, or other network coverage intelligence (e.g. collected from signal strength measurements taken by the network from its users' mobile devices). The coverage database 26 is a record of the geographical locations in which the network operator asserts that coverage is available.

The combiner/correlator 18 takes as its inputs base station traffic reports provided by the performance management system 16 and the base station alarm information provided by the fault management system 14. From these inputs, the combiner/correlator 18 calculates whether there is a potential or unplanned outage (or outages). If, for example, the fault management system 14 is indicating that all of the base stations 12-1 to 12-n are operating normally, but the performance management system 16 indicates that no traffic is being handled by one particular base station, then it is possible that this base station (or its associated backhaul system) may have developed a fault and that this fault has not been picked up by the (limited) range of alarms which the base station can report. This can then be flagged up to the analysis unit 30 (via the intervening elements, as discussed below) which can determine, in conjunction with its other input information (e.g. location), if there really is a fault or if, for example, no traffic is being reported from this base station due to the time of day (or, more likely, night) or its location (e.g. rural and hence lightly used). If a fault is determined by the analysis unit 30, then a repair can be initiated.

The main combiner 20 simply combines all of the information provided by the performance management system 16, the combiner/correlator 18, the main combiner 20, the database of planned outages 22, the database of cell sites, 24, the coverage database 26 and optionally also the fault management system 14 into a single file or directory of information.

The fileserver/buffer 28 takes the combined information, generated by the main combiner 20, and makes it available for retrieval by the analysis unit 30. The information could be stored, for example, as a ZIP file, a CSV (comma-separated values) file or other suitable format. The data is assembled into a data package, containing one or more files or directories, each of which is time-stamped to indicate the time period to which the package relates. The time period covered by such a data package could be, for example, the interval between noon and one minute past noon. The data package contains details of any reported events that arise in, or continue into, the time period to which the data package relates. As should be clear from the foregoing description, these events could be events that are detected during the period covered by the data package (e.g., base station failure alarms) or events that are scheduled or predicted to occur in that time period (e.g., planned maintenance).

The analysis unit 30 takes, from the fileserver/buffer 28, the file containing all of the data provided by the various sources discussed above and processes it to provide information on the status of the network at any requested geographic location within the network, at (or close to) the time of the request. Its functionality will now be discussed in greater detail.

The analysis unit 30 takes, as its input, the file or directory of information that is made available by the fileserver/buffer 28, and which contains the above-discussed network status and configuration information, covering a specific period of time. Utilising a file or directory as a means of transferring the data means that the network operator's system and the (third-party) analysis unit 30 do not need to be closely synchronised/coupled and no streaming information needs to be provided. This is acceptable, since fault reporting does not, typically, need to be undertaken within milliseconds, for example. A report within seconds or minutes is typically more than adequate. The use of a file-based transfer of information about the operator's system into the analysis unit 30 is therefore a simple, elegant and sufficiently timely solution and provides robust protection against dataset transfer interruption.

The analysis unit 30 analyses the file received from the main combiner 20 to combine items of information which enable conclusions to be reached which couldn't (validly) be reached with the pieces of information taken individually. For example, in the case discussed above of a lack of reported traffic from a site, but with no base station alarms being reported, the analysis unit 30 could also look at the list of planned outages; if this indicates that the relevant base station is undergoing maintenance or replacement, then this is the likely explanation for the lack of alarms (the base station is likely to be turned off or disconnected). It would also show no traffic. The analysis unit 30 can also interrogate the base station or cell site location and coverage information within the file, to determine the geographical area which is likely to be impacted by the maintenance and thereby reply to any (user-initiated or customer service representative-initiated) query from that area, with detailed information about the source of the network problem (planned maintenance, in this case) and the likely duration (again coming from the 'database of planned outages'). In this way, the requestor is supplied with accurate, timely and rich information about the problem.

As a second example, consider the case where a user is experiencing a problem in a particular location, yet the alarms from the base stations in that area are not indicating a problem. The analysis unit 30 can examine the data from the performance management system 16; if this is indicating a high degree of usage at a particular cell site or base station in the relevant area, then the likely explanation for the user's problems is that the site is congested. Again, this can be fed back to the requestor, optionally including a likely time that the congestion will ease (based upon historic knowledge of the congestion patterns at that particular site, for example).

As a third example, consider the case where a user is experiencing a problem in a particular location, the alarms from the base stations in that area are not indicating a problem and the performance management system 16 indicates that there is little or no usage of the network at that time. The analysis unit 30 can conclude from the alarm data and the performance data that there is a fault impacting the user's location. This can be reported to the user (to assuage concerns) and to the network operator (to initiate a repair).

As a fourth example, a mobile network typically relies upon many more network elements than just the base-stations. For example, backhaul of the signals to/from the base-station is typically provided by either microwave links or fibre-optic links. Likewise, the base-stations are controlled by other elements, such as an RNC (radio network controller) in the case of the 3G network, and will also be connected to some form of control and/or switching system, such as a MSC (mobile switching centre) in the case of a 3G network. In the case of a BSC (base station controller) or MSC in a 3G network (or any similar element in a different mobile communications architecture), the failure of such a network element will lead to multiple base-stations being unable to communicate successfully with their connected users. The analysis unit 30 can recognise such a condition, based upon the pattern of user fault reports or queries across the area in which are located the base stations subservient to the BSC or MSC. The analysis unit 30 can therefore recognise that a fault has occurred faster than many other mechanisms of fault reporting and will cover mechanisms which are simply not reported by the limited range of, typically hardware-related, alarms which are fitted to the base-stations or other network elements. One example of such a fault mechanism would be a software glitch, partial 'crash' or infinite loop; such operation may appear 'normal' to the limited hardware alarms but result in a complete loss of normal service to the network users.

Note that, as discussed above, the fault management system can report directly to the main combiner of the NSRS 10 (as shown by the dashed-line in FIG. 1). This reporting method can be used, however experience has shown that using this mechanism alone can lead to a large number of 'false alarms', i.e. hardware faults reported in one or more base station systems when no such fault exists in reality and the base station is functioning acceptably, or where a low-level fault exists, but where the base-station can continue to operate, perhaps with a slightly reduced coverage area or overall capacity. It is possible that this situation occurs because the fault management system 14 takes a very pessimistic view of a fault and reports it as 'catastrophic', when in fact it only has a minor impact. For example, if a 'low transmit power' alarm is set, this could indicate anything from a complete loss of transmit power through to the power output falling just below specification. In the former case, this would clearly have a major impact on the network and would be a solid indicator that the NSRS 10 should report such a problem in response to a user query; in the latter case, the impact upon the network would be negligible and a user-reported problem would almost certainly have another cause (or just prove to be a single, spurious, report, where perhaps a handset problem is the real issue).

The output or response provided by analysis unit 30 in response to a user query, can take a variety of forms. For example:

If the user places a call to a customer service centre, then the operator can inform the customer of the situation, based upon data delivered to his/her computer screen from the analysis unit 30 (in response to location data from the user, inputted into the NSRS 10 by the customer service representative).

A query can be submitted via an 'app' on the user's mobile device, with a response coming back via the app or a text message or other delivery means to the user's mobile device.

A query can be submitted via a web page, either on the user's mobile device or any other suitable (fixed or mobile) terminal, with a response coming back via the same or another web page or another means, such as a text message.

Social media feeds (e.g. Twitter, Facebook, web-chats etc.) can be monitored (either automatically via suitable software or manually by human operatives) for 'chat' indicating a likely service outage at a particular location. Feedback can be provided via the same social medium (or more widely, via all popular social media).

Many network operators have a presence on the high street via their own, branded, shops or concessions within other shops. Customers will sometimes complain of coverage issues, in person, when visiting such outlets; feedback can be provided directly by the store staff.

Clearly, there exists a wide range of ways that the relevant data could be presented (notably via an app or a website). However, as an example, the following reporting mechanism could be used.

RED. A known problem exists covering the user's location. This could be due to, for example:

Planned work on the network, i.e. a planned outage for maintenance.

A nearby site has failed, and this is known about already (e.g. through other user reports and a subsequent investigation by the network operator).

A highly-likely site failure, identified from the large volume of submitted queries/complaints from users in a specific area (and covered by the same site, or sites using the same BSC, MSC, backhaul infrastructure, etc.). Once the number of queries, from a given geographical location, exceeds a certain threshold, then it is deemed that a fault must exist in that location, even though the network itself (e.g. alarms, fault management systems etc.) has not otherwise reported or identified a fault.

AMBER. The operator is aware of issues in the area (e.g. capacity problems), however users should not be severely impacted (and the problem will resolve itself without explicit action, such as a repair, by the network operator). Or there is a known issue slightly further away and, whilst the user should not be impacted, it is possible that the issue could be the cause of any disruption.

GREEN. No problem is known to exist at that location or with any site which should cover that location (where the coverage area could be hundreds of metres, in dense urban areas, to tens of km in rural areas). In this case, it may be that the user is the first to spot/report a genuine fault, or it could be that there is an issue with their mobile communications device.

GREY. The network does not claim to (and is not designed/predicted to) cover that geographical location.

The sources of information provided to the combiner 20 can be combined in order to provide statistical or analytical information to a network operator, regarding the performance of his/her network. Such information could include:

The number and type of faults which are identified by crowd-sourcing prior to being identified by more traditional means (e.g. equipment alarms and fault management systems).

The time between the reporting of a potential issue by crowd-sourcing and the identification of that issue by more traditional means.

The number and types of issues which are identified by crowd-sourcing and which are never identified by more traditional means.

Figure 2:
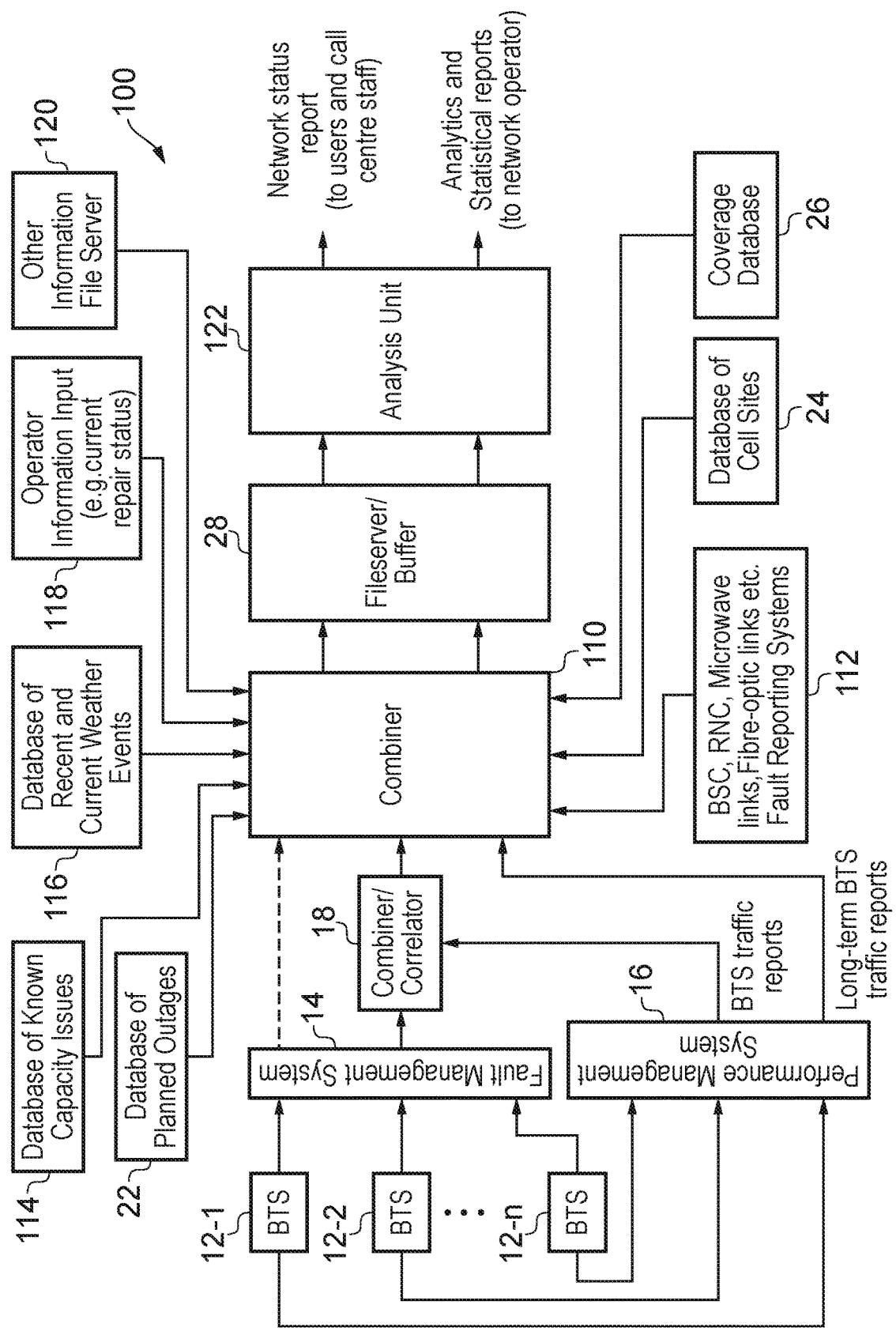
FIG. 2 is a block diagram schematically illustrating the architecture of another network monitoring tool that is connected to a network that is to be monitored.

FIG. 2 shows an enhanced NSRS 100. In this case, a larger (richer) dataset is available, from a wider range of data sources. The operation of this system is similar to that discussed above, however the further input sources provided allow a better understanding of the network's issues to be divined and reported. Elements of the NSRS 10 of FIG. 1 that have been carried over to the NSRS 100 of FIG. 2 retain the same reference numerals in FIG. 2 and their purpose will not be described again here.

In the NSRS 100, the combiner 110 is different to that employed in NSRS 10 of FIG. 1 in that combiner 110 combines into the file or directory that it prepares for the fileserver/buffer 28 information from additional data sources. The analysis unit 122 in NSRS 100 of FIG. 2 is different to the analysis unit 30 of NSRS 10 of FIG. 1 in that analysis unit 122 has a wider range of data types to draw on when searching for faults in, or replying to queries about, the operator's network. The additional input data sources made available to combiner 110 will now be discussed.

The database of known capacity issues 114 is a database in which all of the known capacity issues (i.e., difficulties in meeting user demands on the service) within the network are stored. Such capacity issues will only occur at particular times of day, with the time of day (and day of the week) at which issues typically occur varying from site to site. For example, a cell site located close to the entrance to a busy commuter train station might suffer capacity problems during the morning and evening rush hours from Monday to Friday, but not suffer any capacity problems at the same times on a Saturday or Sunday. Likewise, a base station located in a commuter town could suffer capacity issues in the evenings and at weekends, but not during the working week.

The capacity issues discussed above could well be the correct explanation as to why a user is struggling to make a call, for example, during known periods of high cell-site usage. In cases where moderate numbers of queries are being made, relating to the area covered by that site and at a time of known high usage, then the analysis unit 122 could respond to such queries by indicating that available network capacity is likely to be the issue and that normal conditions will resume after a given time (where that time is based upon past experience of when the capacity issue subsides).

In the case where very high volumes of queries are being submitted, in the area surrounding the congested site, the analysis unit 122 could indicate to the network operator that equipment at the cell-site has likely failed, thus prompting the network operator to visit the site and effect a repair.

Severe weather can have a significant impact upon the operation of a base station or cell site (or even a group of sites). For example, very heavy rain can impact upon the performance of the microwave links which provide backhaul to the cell site (or sites); if the microwave link fails (or is operating at a severely-reduced capacity), then the site is, in effect, 'off-air', even though the base station or cell site itself would be reporting no issues/alarms. Likewise, lightning activity can destroy a base station or its antenna or feeder cable systems. The database 116 provides the combiner 110 with information about current and recent weather events that might impact network performance so that the analysis unit can make an improved diagnosis of the likely cause of a service outage in a particular area, which could also be used as a reply to a query from a user of the network.

During the progress of a fault and its repair, network operations (control centre) staff will typically be kept informed of the cause of the fault and the status of the repair process. Such updates can come in a variety of ways, such as phone calls from the repair technician. The network operations staff can supply this information as a feed 118 into the combiner 110 so that the analysis unit 122 can use the information to indicate to customers the progress of the repair and the time by which normal service is expected to resume.

As discussed earlier, a mobile network typically relies upon many more network elements than just the base-stations. For example, backhaul of the signals to/from the base-station is typically provided by either microwave links or fibre-optic links. Likewise, the base-stations are controlled by other elements, such as an RNC (radio network controller) in the case of the 3G network, and will also be connected to some form of control and/or switching system, such as a MSC (mobile switching centre) in the case of a 3G network. Automated fault-reporting systems can be associated with such elements, but they are often simple and designed for reporting easily recognised faults, which are normally severe in nature. Information from these fault reporting systems is provided as a further feed 112 to the combiner 110 so that the analysis unit 122 can use the data to assist in the diagnosis and reporting of faults and in responses to user queries.

Information feed 120 to combiner 110 represents other sources of information that may be available, from time to time and which are also relevant to the operation of the network. For example, news reports could detail the emergence of terrorist activity, either directly targeting communications infrastructure or targeting a major city or event (and thereby generating a huge amount of network traffic at a time and in a location where capacity is usually not an issue). Such information could be provided from a website, a streaming news service, via a file deposited in a drop-box style buffer store or any other suitable mechanism. The analysis unit could include appropriate information from feed 120 in its responses to user queries regarding the performance of the network.

All of the additional sources of information 112-120 can be combined, intelligently, by the analysis unit 122 in order to identify faults in the network and in order to inform a user, in response to a user query, with rich detail as to the cause of the problem, the progress of its repair and (optionally) the likely time of completion of the repair.

Figure 3:
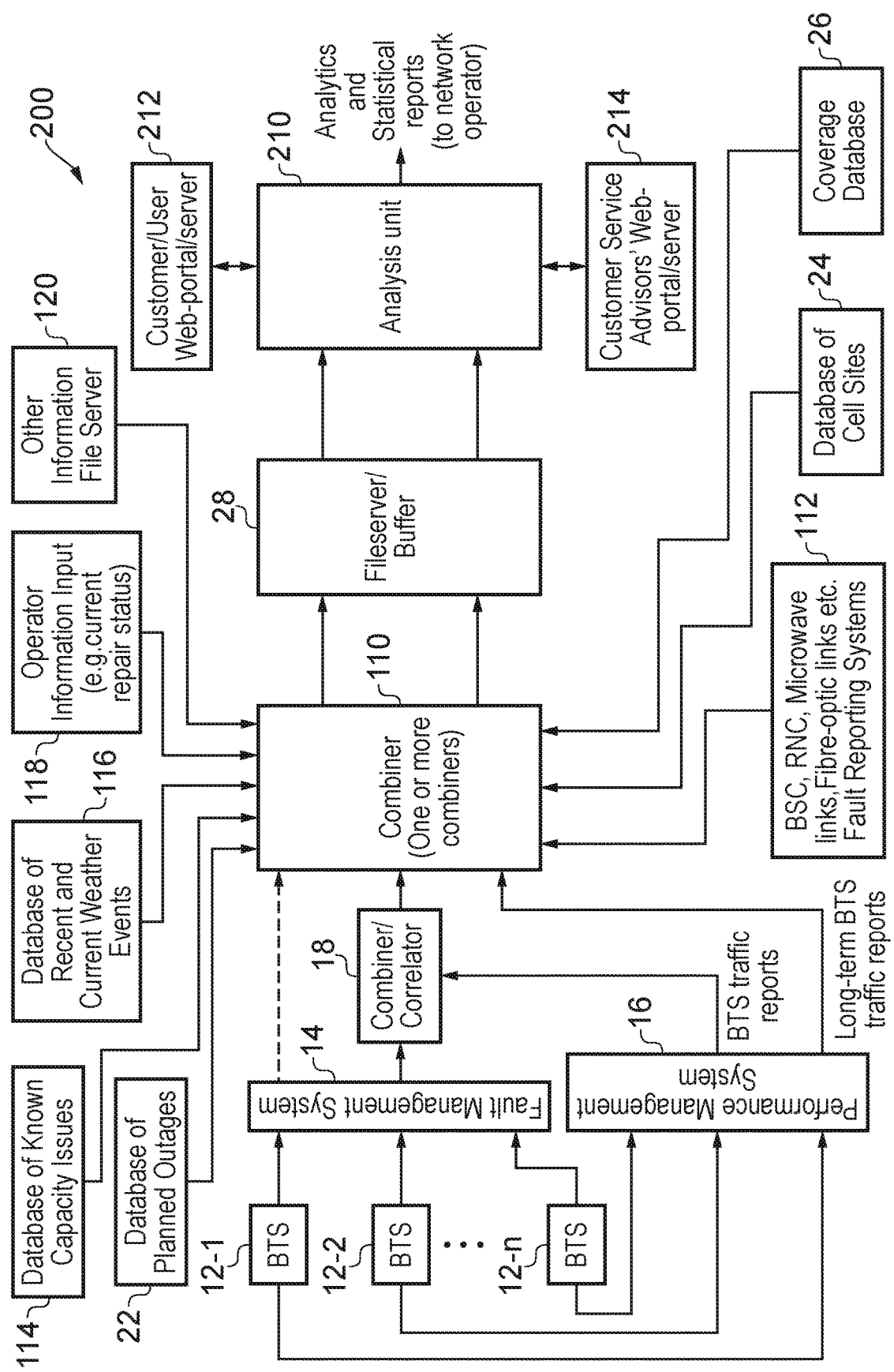
FIG. 3 is a block diagram schematically illustrating the architecture of yet another network monitoring tool that is connected to a network that is to be monitored.

FIG. 3 shows an enhanced NSRS 200. In this case, more powerful use is made of queries about network performance, whether from users, customer service operatives or network maintenance/management personnel. Elements of the NSRS 100 of FIG. 2 that have been carried over to the NSRS 200 of FIG. 3 retain the same reference numerals in FIG. 3 and their purpose will not be described again here.

In the NSRS 200, the analysis unit 210 is different to that employed in NSRS 100 of FIG. 2 in that analysis unit 210 utilises data provided by two query portals 212 and 214. Each of the portals 212 and 214 is implemented by a server that provides clients with a web form for instructing the analysis unit 210. The portals 212 and 214 provide much the same function but to different groups of people.

Portal 212 is a user portal that allows users of the mobile network to submit queries about the performance of the network. In order to submit a query about the performance of the network, a user establishes a connection to the server that is the user portal 212 using a computer (such as a smart phone) and is served a web form for submission of the query. The form prompts the user to submit his or her current location, if he or she is experiencing problems at present, at that location, or the location at which he or she experienced a problem (in the event that coverage was lost at that location, hence making reporting impossible using his or her mobile device). The form is then returned to the user portal 212 with a time-stamp indicating the time the form was completed. It is possible for the form to include other fields for the user to complete, and entry of data into those fields may or may not be mandatory. As an example of a further field that could be included in the form, there might be a field for the user to indicate the nature of the problem (e.g. by selecting from a drop-down list of possible problems, such as: complete loss of signal, dropped call, slow data, poor call quality, etc.) Some examples of other fields that could be included in the form are the user's name, mobile device type, mobile phone/device (telephone) number, etc.

Note that the connection to the user portal 212 could be established by user commands issued to a program other than a browser on a computing device available to the user (for example, the program could take the form of an app on a smart phone). Additionally, if the device that the user is using to submit his or her query is location-aware (as would typically be the case when the device is a smart phone), then the user location could be supplied by the device rather than entered manually by the user.

Portal 214 is a network operative portal that allows the network operator's personnel (or sub-contracted call-centre personnel) to submit queries about the performance of the network. The network operative portal 214 can be established in the same ways as the user portal 212, the chief difference being in the role of the person making the query. Various types of operator personnel might initiate performance queries through the network operative portal 214. For example, a network operative concerned with the technical management of the network or fault repair might enter a performance query though the network operative portal 214 to ascertain information about the functioning or performance of the network at a particular location. Similarly, a customer service representative of the network operator might enter a performance query through the network operative portal 214 on behalf of an end-user who has enquired with the customer service representative about network performance at a specific location.

The analysis unit 210 interrogates the file obtained from the main combiner 110 in response to performance queries received through the portals 212 and 214. The analysis unit 210 responds to a performance query with information about the condition and performance of the mobile network in the location to which the query pertains. In this sense, the response provided by analysis unit 210 to a performance query is much the same as the response that would be provided by the analysis unit 122 of FIG. 2 and the analysis unit 30 of FIG. 1. For example, the analysis unit 210 could respond to a performance query by indicating that at the location concerned there is, as appropriate: a fault in the network (and perhaps also the estimated time at which the fault will be resolved); congestion in the network (and perhaps also the estimated time at which the congestion will ease); planned maintenance underway (and perhaps also the estimated time at which the maintenance will finish); or apparently nothing awry (suggesting to an end-user that his mobile device may be at fault).

The analysis unit 210 is arranged to store information from network performance queries and to use that information together with the information in the file obtained from the main combiner 110 in order to produce more powerful responses to future performance queries. An example of a rudimentary way in which the analysis unit 210 can make use of historical performance queries is to use the locations to which the queries correspond in order to establish the density of queries across the area covered by the network. Then, any location within the network that has a sufficiently high density of performance queries can be deemed to contain a fault. The density of queries could be used in more subtle ways. For example, the query density could be used as another factor (alongside, say, base station alarm conditions, network performance measurements, and maintenance schedules) in deciding the condition of the network that is reported in response to some new performance query. In this scenario, the analysis unit 210 could, in response to a performance query about a location, determine that there is no planned maintenance at the location, no base station alarm at the location, no traffic at the location but more than a threshold number of queries about the location over some predetermined historical period. Following this determination, the analysis unit 210 could reply to the query indicating that there is a fault at the location (without recourse to information about, say, the level of usage of the network that is expected at the time of the new query).

Note that it is entirely possible for the various sources of information 22-26 and 112-120 to fail, either individually or all together, such as when a major IT system failure occurs in the network operator's IT system. Since the web-based (or app-based) interface is typically hosted, together with the NSRS 200, on an entirely different system, such as one provided by a cloud-computing service provider, it is very unlikely that both the operator's and the cloud-service provider's IT systems will fail at the same time. This has the consequence that the web-based customer interface will still operate, will still collect information about where network problems are occurring and will still be able to keep end-users informed of the status of such faults (e.g. whether they are known or not) even if the main sources of fault information 22-26 and 112-120 within the network are not operational. This is a very useful result: customer service, in the form of the provision of useful customer information, is maintained even when major (or minor, localised) IT or other reporting failures occur within an operator's network.

Although, the concept of using query density to enrich responses to new user queries has been described in conjunction with a system, i.e. NSRS 200, that collects performance queries through portals implemented by servers, it will be apparent to the skilled person that the determination and exploitation of query density can be used in variants, such as NSRS 30 and 100, that use techniques other than portals 212 and 214 for receiving performance queries.

There are various way in which to exploit information about the locations in respect of which are submitted queries about network performance. As discussed above, the location in respect of which a performance query is submitted can be used by a NSRS to provide a response containing information pertinent to that location (e.g., there appears to scheduled maintenance underway). Also as discussed above, the locations in respect of which performance queries are submitted can be used to map query density over the extent of the network. It is also possible for a NSRS to analyse the distribution of performance queries in other ways in order to identify faulty equipment within the network.

Figure 4:
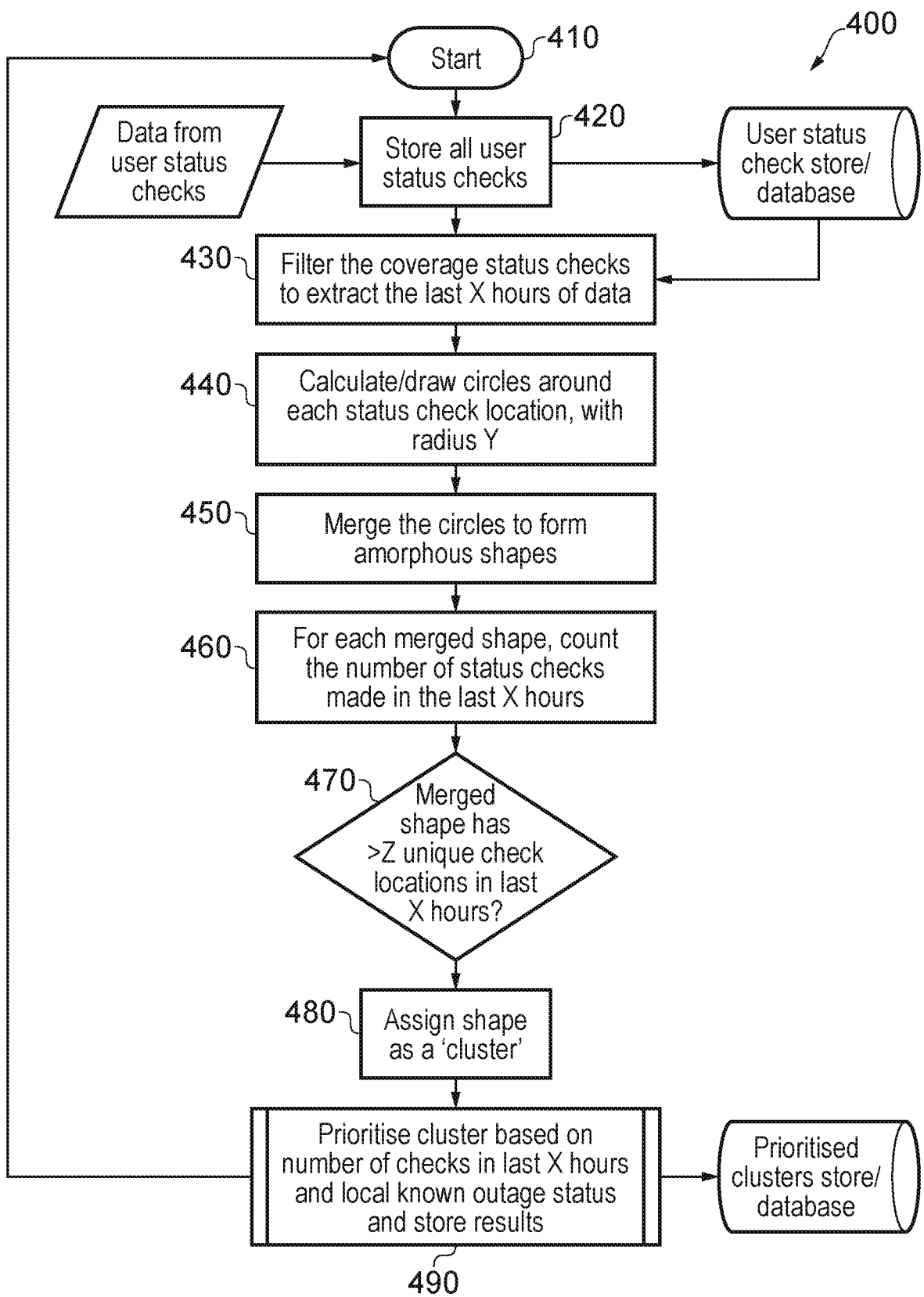
FIG. 4 is a flow chart illustrating a process performed by a network monitoring tool.

FIG. 4 shows an example of a 'cluster-forming' algorithm 300 that can be operated by an NSRS in order to assess whether a meaningful grouping of user fault reports exists, which might indicate a network fault (possibly unknown to the network itself or the network operations staff). The algorithm could be operated by, for example, the analysis unit 30 of NSRS 10, the analysis unit 122 of NSRS 100 or the analysis unit 210 of NSRS 200. The details of the algorithm 400 will now be discussed.

The algorithm starts 410 and then goes on to store 420 all of the geographic locations at which users have checked the status of the network (to see if a fault exists or to report network problems). The users can do this in a variety of ways, for example by filling in details on a dedicated web-page, utilising an app designed for the purpose on their mobile device, calling one of the operator's customer service representatives or reporting an issue to the sales staff at one of the operator's retail stores.

The stored locations at which users have made network status checks are then filtered 430 to extract the last X hours of data (where X could be 4, for example). This ensures that only 'live' issues are flagged up by the system, with historic (and likely repaired) issues thereby being decreasingly relevant. In effect, this process forms a 'sliding window' within which user reports are considered, with newer events gradually becoming more prominent (and hence evident as possible/likely faults) and older (probably resolved) events gradually becoming less prominent and eventually disappearing from the system/algorithm (although they may be stored indefinitely, if desired by the operator, for example to highlight unreliable sites which experience regular issues).

The algorithm 400 then moves on to calculate 440 circles surrounding the locations of user queries, where each circle in a given geographic area has a radius Y. The value of Y depends upon the type of location at which the user reports are made; for example Y may be 0.25 km in a built-up area, such as a city, or it could be anything from a few hundred metres up to many kilometres in a more rural location. The value of Y, therefore, is a fraction of the typical radius of coverage of the cells found in that location: larger cell radii will lead typically to larger values of Y and vice-versa.

Adjacent or closely located circles are then merged 450 to form amorphous shapes, each amorphous shape extending over a spatial zone. Within these amorphous shapes, for example, the number of distinct locations of user reports or queries submitted in the last X hours is summed 460 and the resulting number is compared 470 to a threshold value. If the total number of reports/queries exceeds a certain threshold (say, 3) then the amorphous shape is identified 480 as a 'cluster', i.e. an area which is likely to contain a network problem. Note that, in place of a threshold value, other filtering mechanisms could be used. For example: finding places with more than Z distinct users (by session ID), types of users (e.g. business, residential) etc.

An alternative method of identifying a cluster involves counting the number of reports/queries submitted from a given location where each report arises from a single, unique, user, with such unique users being identified by their unique user identifiers (e.g. their IMSI—International Mobile Subscriber Identity—number, or any other suitable, unique, identifier). In effect, this could be viewed as each unique user getting one 'vote', such that when the number of 'votes' exceeds a given threshold, a 'cluster' is identified. In this way, a cluster can be identified when a large number of unique-user reports are made from a single location (e.g. building).

The identified clusters are then ranked 490 in order of the number of reports/queries logged and in terms of whether a known network outage is located in the area covered by, or very close to, the cluster. Clearly, a known outage is very likely to be the explanation for the large numbers of queries/reports in that area and the customers can be informed accordingly (by the customer care staff, the dedicated web page or app etc.). Where no known outage exists, but a large number of queries/reports have been logged (recently), then it is likely that an unknown fault exists and customers can be informed (as outlined above) that an 'unknown problem has been identified and is under investigation'. The network operations/maintenance staff can also be informed and can begin to trace the fault. In this way, customers feel that they are being kept informed and are also reassured that they are not experiencing a fault with their device (thereby generating unnecessary technical queries to the operator or staff in its retail outlets). Likewise likely faults are identified quickly and can therefore be remedied before they escalate and generate, for example, bad publicity for the network operator.

Figure 5:
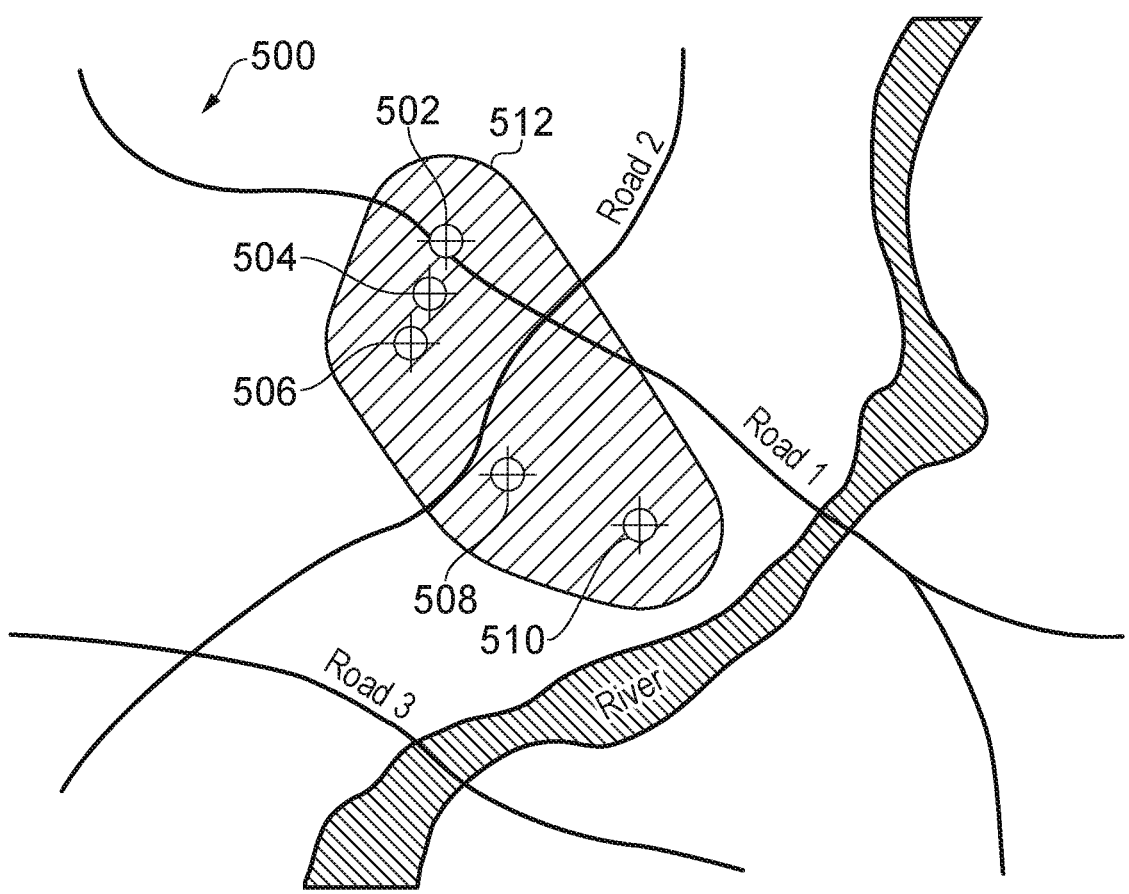
FIG. 5 is a schematic illustration of a map of user queries about network performance.

By way of example, FIG. 5 shows an example of a map 500 on to which the locations of five user queries have been plotted, with a respective circle 502-510 of radius Y drawn around each location. In FIG. 5, an amorphous shape 512 has been created by merging the circles 502-510, although it is worth noting that the amorphous shape is not simply formed by a line tracing the intersecting circumferences of the circles 502-510; it is generally larger than such a shape would be, as is illustrated in FIG. 5. The circles 502-510 may be merged to form the amorphous shape 512 using an algorithm such as a 'Convex Hull' algorithm or a 'Concave Hull' algorithm or any other suitable algorithm. The amorphous shape 512 will be identified as a cluster if the number of queries within the shape—in this instance, five—exceeds the threshold that has been set for cluster identification. Clusters will often start small, like the one depicted in FIG. 5, and then grow, as more and more reports/checks are performed by users. Such 'growth' is often an indication of an unresolved network issue. Likewise, as the clusters shrink again over time, this is an indication that the fault is resolved (or that congestion is reducing, in locations where no actual fault exists).

Figure 6:
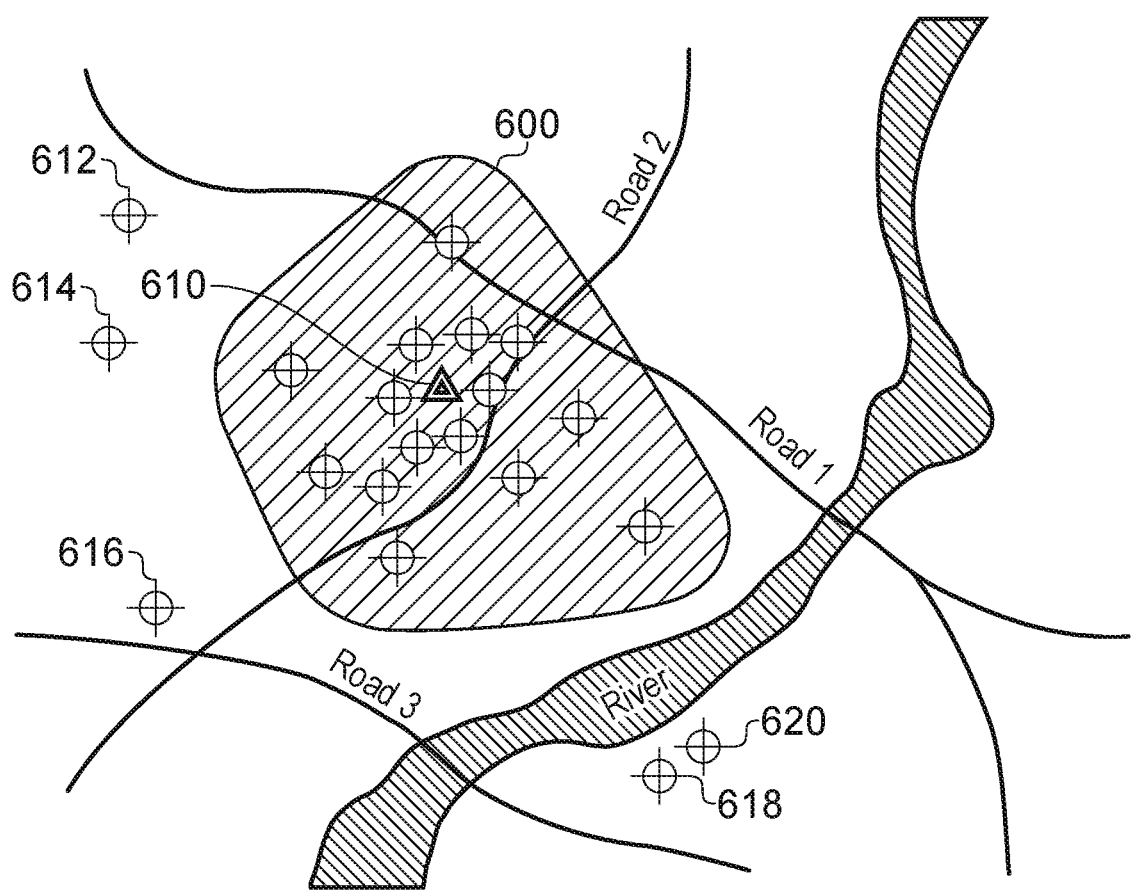
FIG. 6 is a schematic illustration of another map of user queries about the performance of a network.

FIG. 6 shows an example of a cluster 600 in an area experiencing severe disruption to service, together with the location of a known network outage (shown as a triangle 610). Clearly, in this case, the network outage is the explanation for the cluster of checks/reports. Note also, in FIG. 6, that there are a small number of reports 612-620 in the area surrounding the main cluster 600, however these are not sufficient in number to result in their own clusters, nor are they deemed close enough to the main cluster 600 to be included within it (although they may result from the same root cause, i.e. the nearby network outage, forcing consumers onto surrounding base-stations and thereby creating additional congestion in those areas).

The algorithm discussed with reference to FIG. 4 enables the formation of geographic clusters of query reports and their analysis to determine if there is a potential network outage. This approach works well where traffic levels are relatively high and relatively consistent, such as at a city centre location during office hours. The 'sliding 4 hour window' will show a build-up of reports within a cluster, as more and more people encounter the problem, and then a gradual decay once the problem is solved and the impact of users who encountered the issue shortly before it was resolved, fall out of the window. This idealised picture assumes that a relatively constant number of users are served by a given site and a steady percentage of those submit a query or report a problem.

There are many situations, however, which it would be useful to identify, where this is not the case. For example, if a fault occurs late in the evening, some users will encounter the problem and submit a query, however the number of queries will naturally fall as the majority of potential users go to bed. The number may rise again in the morning, if the fault has not otherwise been identified overnight (e.g. by base station or RNC alarms, etc.), but may fall again as commuters leave the area, heading for work. None of these falls in the number of queries indicated that the fault has been resolved, merely that fewer users are encountering the problem, because there are fewer users in the area.

Likewise, if there is an intermittent fault at a particular site, the level of queries can rise and fall multiple times over a longer period. The same effect can also occur due to network congestion, although in this case, the rise and fall in queries should form a more regular pattern, peaking at weekday rush hours, for example.

Likewise, the shape of clusters can change dynamically due to the nature of the customer outage checks—customers submit checks from quasi-random locations within the coverage area of the affected cell or cells and, whilst a very large number of checks would result in an even distribution over time, the smaller numbers of checks typically submitted can lead to a skewing of the cluster shape and this skewing effect changing over time.

Figure 7:
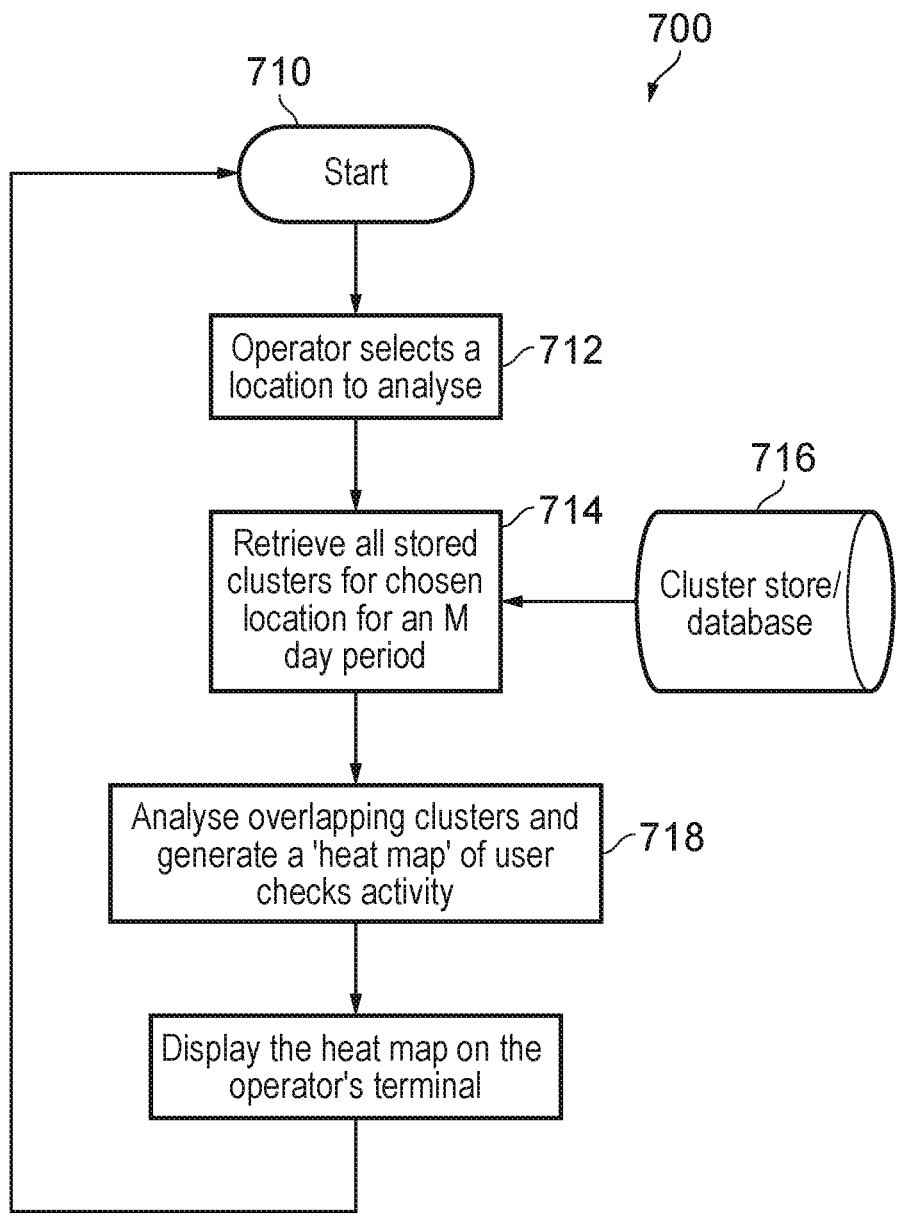
FIG. 7 is a flow chart illustrating a process performed by a network monitoring tool.

An enhancement to the approach outlined with respect to FIG. 4 is shown in FIG. 7. The algorithm 700 shown in FIG. 7 provides a way of forming 'super clusters' to detect longer term, lower level, or recurring events at a particular site or sites within a network. In essence, the algorithm 700 looks at cluster activity over a much longer time period than the window of the normal cluster algorithm 400. The time window, W, of the normal cluster algorithm 400 could be 4 hours, for example, or any other suitable time period. In doing this, the algorithm 700 forms larger, 'super clusters' indicating the checks undertaken by customers, and their numerical intensity, over a longer period, say, a 7, 14 or 28 day period. The operation of algorithm 700 will now be discussed.

The algorithm 700 starts 710 and an operator (for example) selects 712 a geographic area to examine. Note that the area to be examined could be selected or highlighted by the operator's software system, which could be designed to bring potential problem areas to the specific attention of the operator, or by any other means. The cluster information for an M day period, for the area under examination, is then retrieved 714 from a cluster store 716. The number of days, M, could be 7, for example, or any other suitable number (including a fractional number).

Figure 13:
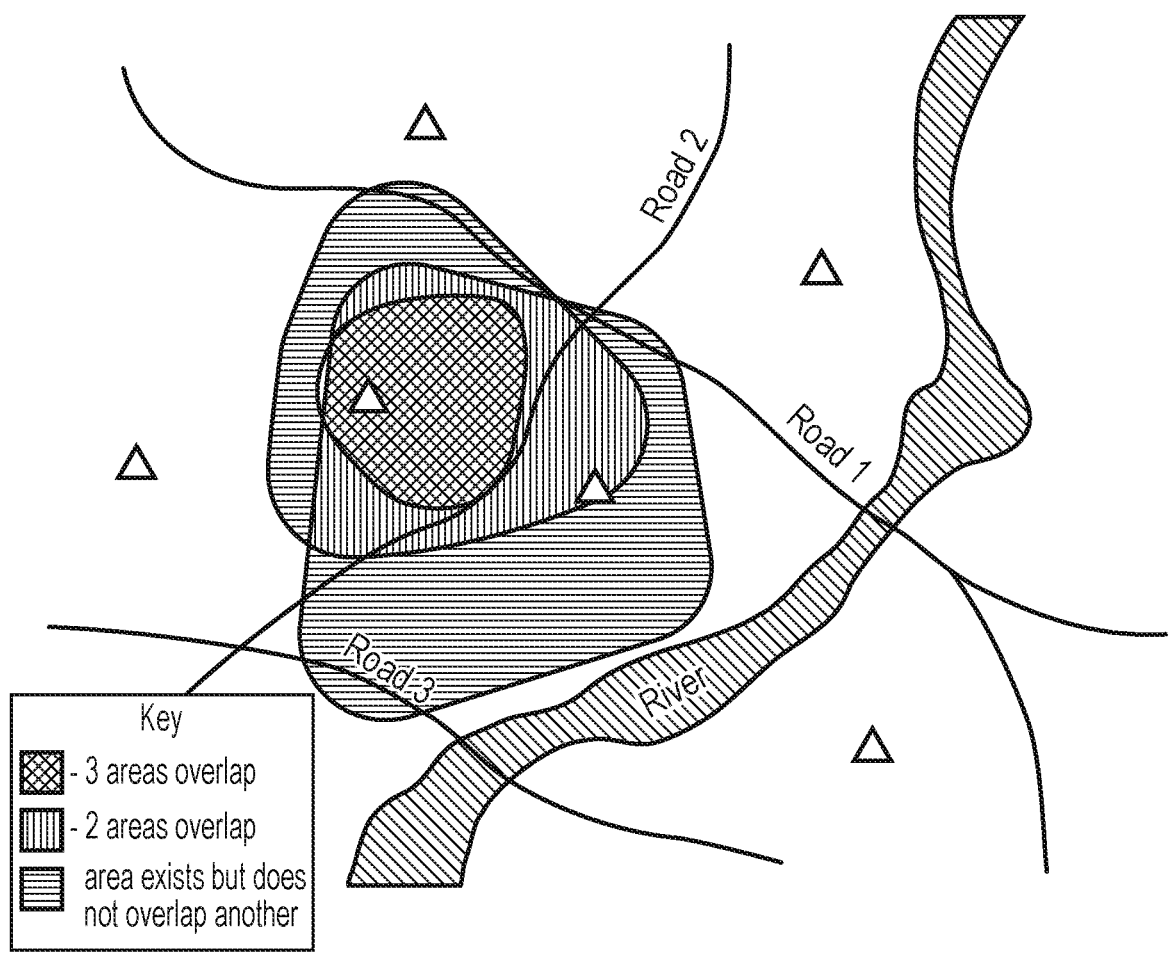
FIG. 13 is a schematic illustration of a map indicating densities of user queries about the performance of a network.

In the next step, the clusters are analysed 718 to identify overlapping clusters and these are further analysed (i.e. stacked) to generate a 'heat map' indicating the density of the stacked clusters. The more X hour clusters from the M day period which cover a given point, the darker, or more vividly coloured, for example, the heat map is at that point. This analysis is repeated for each point on the relevant area of the map being examined by the operator until all of the X hour clusters within the M day period have been analysed. The result is a heat map of the form shown in FIG. 13.

Figure 8:
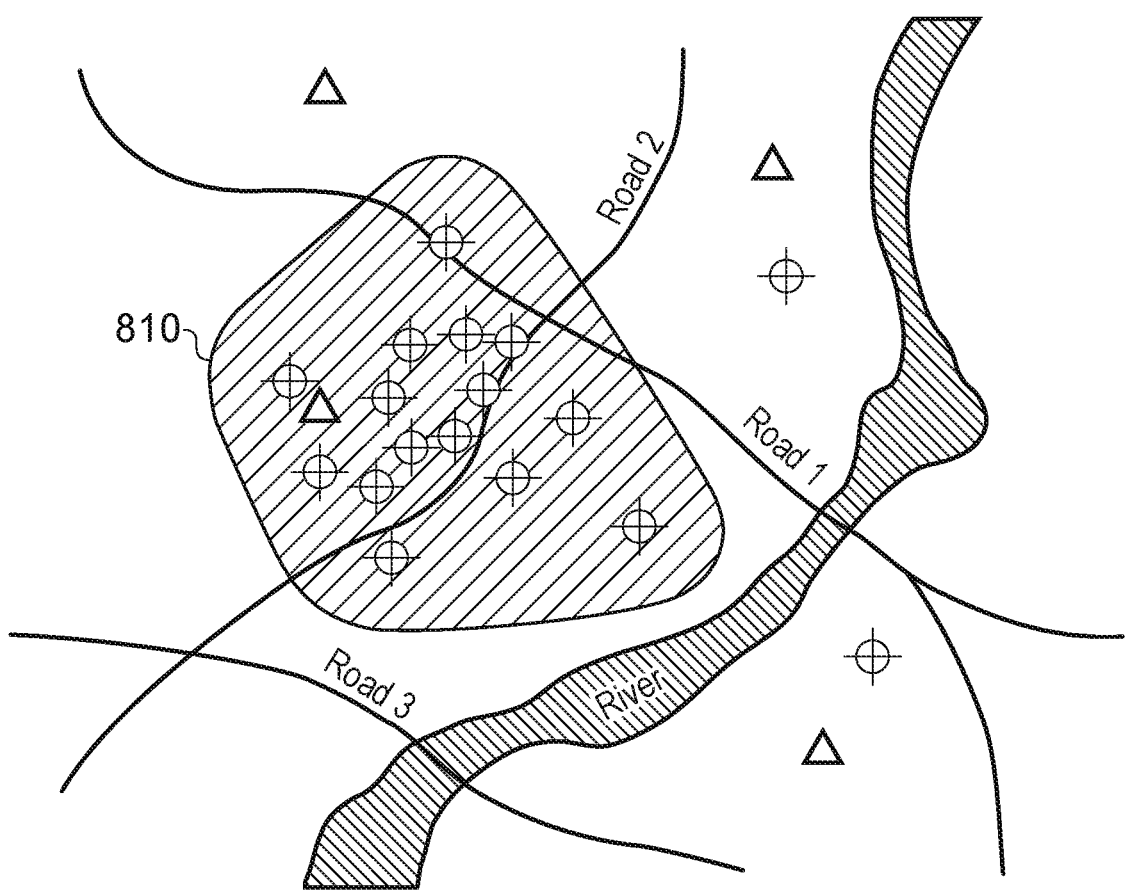
FIG. 8 is a schematic illustration of a further map of user queries about the performance of a network.
Figure 9:
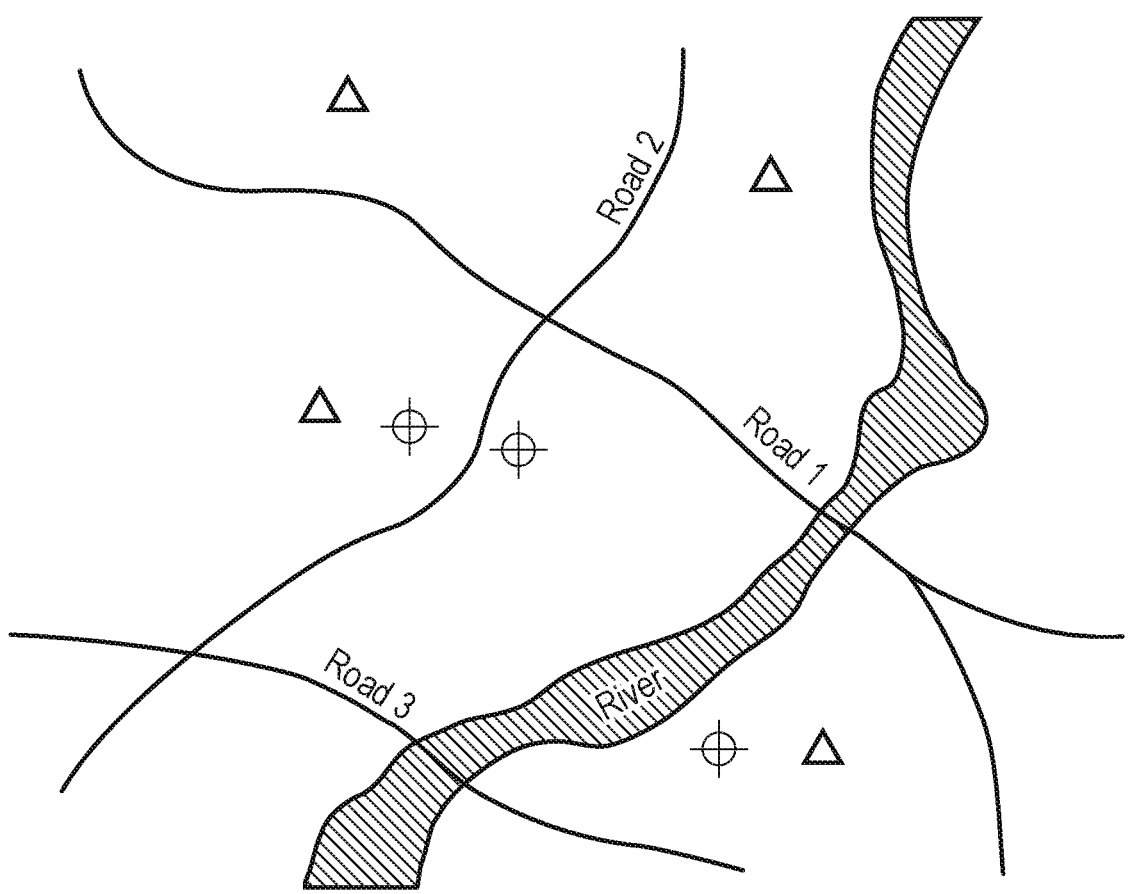
FIG. 9 is a schematic illustration of yet another map of user queries about the performance of a network.
Figure 10:
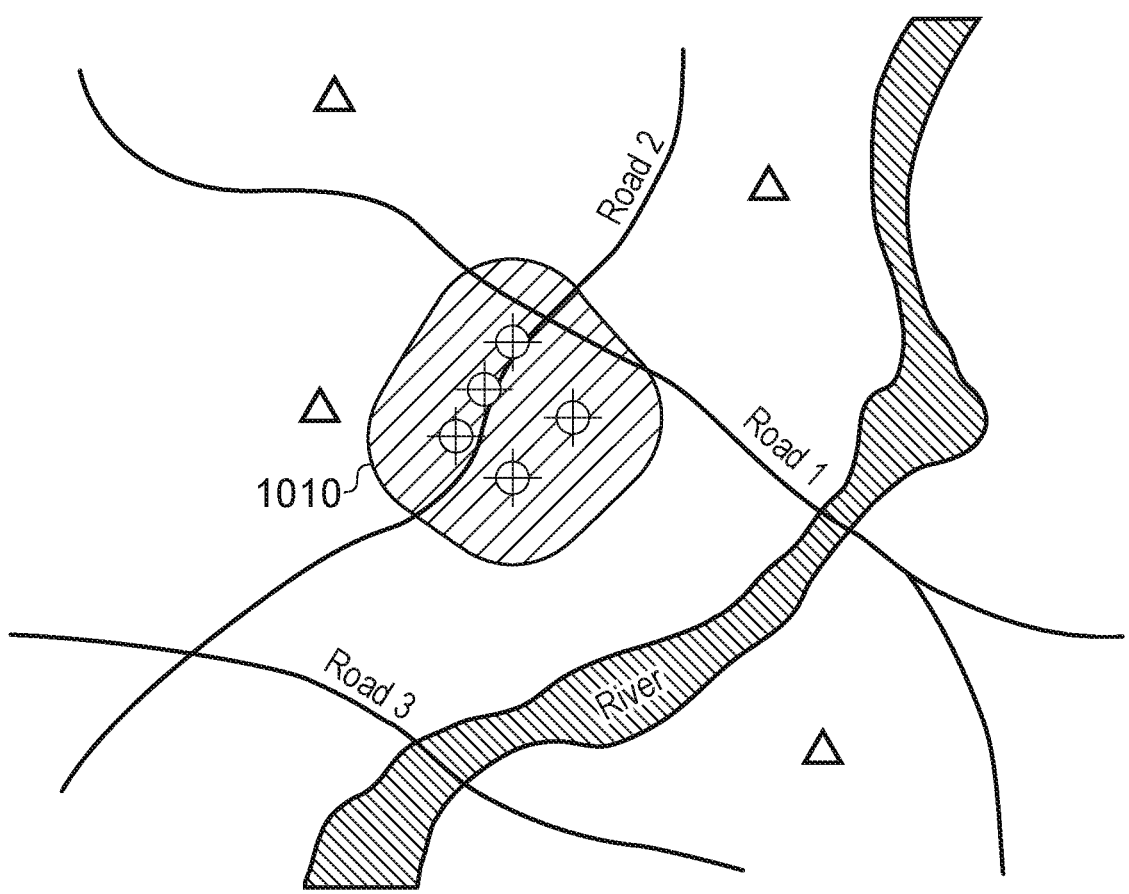
FIG. 10 is a schematic illustration of another map of user queries about the performance of a network.

FIGS. 8 to 10 illustrate a problem of the kind that algorithm 700 is intended to address. FIGS. 8 to 10 show 4-hour data sets for the same geographical area, at three different times, T1, T2 and T3. It can be seen that there is relatively little cluster activity and also that a cluster 810 appears in FIG. 8 for time period T1, no cluster appears in FIG. 9 for time period T2, and, in FIG. 10 for time period T3, a cluster 1010 appears, but with a shape different to cluster 810 for time period T1. It could be concluded from FIGS. 8 to 10 that there is not really a significant problem at this map region.

Figure 11:
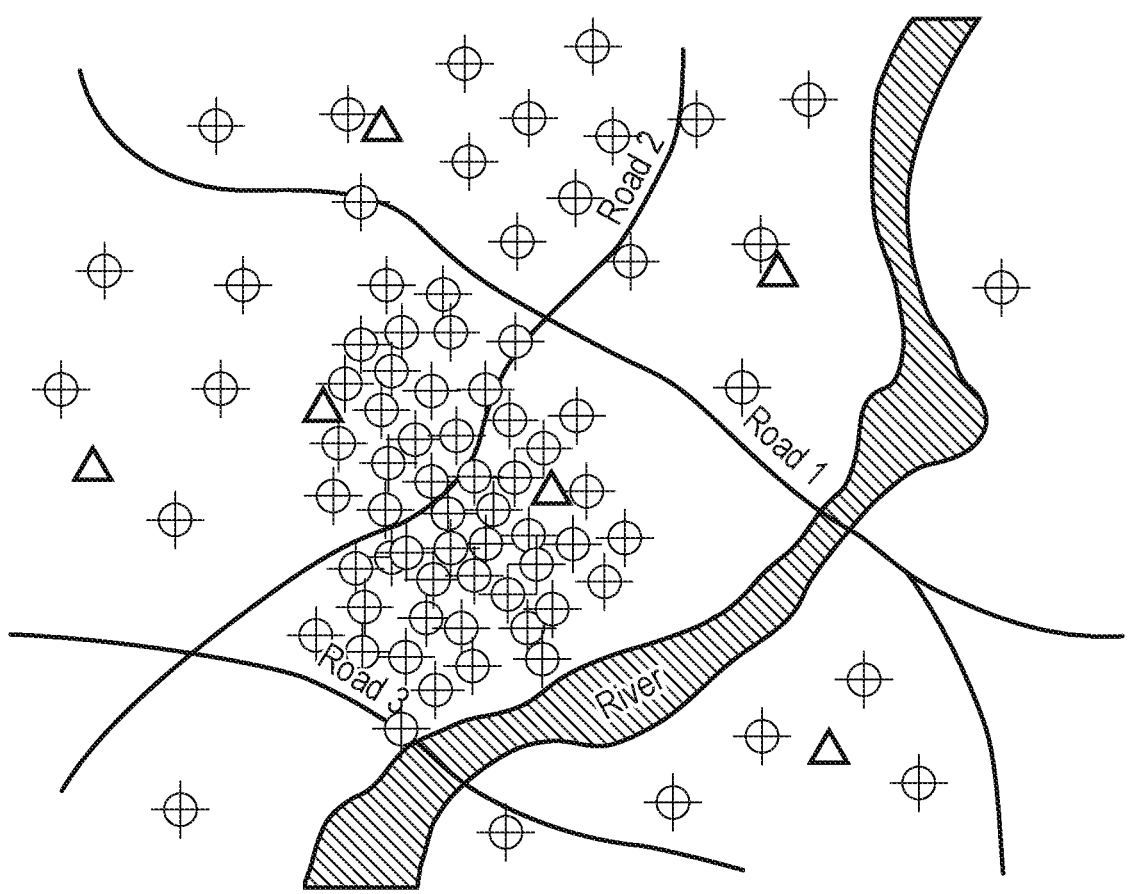
FIG. 11 is a schematic illustration of yet another map of user queries about the performance of a network.

FIG. 11 shows, albeit at a smaller scale, the same geographic area as FIGS. 8 to 10. However, FIG. 11 now shows all of the user coverage checks undertaken in a 28 day period. This now indicates that there may be a problem, but does not show clearly where the problem lies. There are, for example, a number of performance query indicators (as before, circled points) scattered in the upper 5th (approximately) of the picture which may or may not be associated with the remaining performance query indicators.

FIG. 12 shows, again, the same geographic area as FIG. 11. However, in FIG. 12, the 'super cluster' algorithm 700 of FIG. 7 has been applied. The various clusters, calculated and stored over the 28 day period, have now been stacked or overlaid and a clear pattern can be seen to emerge, indicating the area impacted (and also that there is clearly a long-running problem in this area). This problem might well have been missed when considering purely the original (4-hour) clusters.

Figure 12:
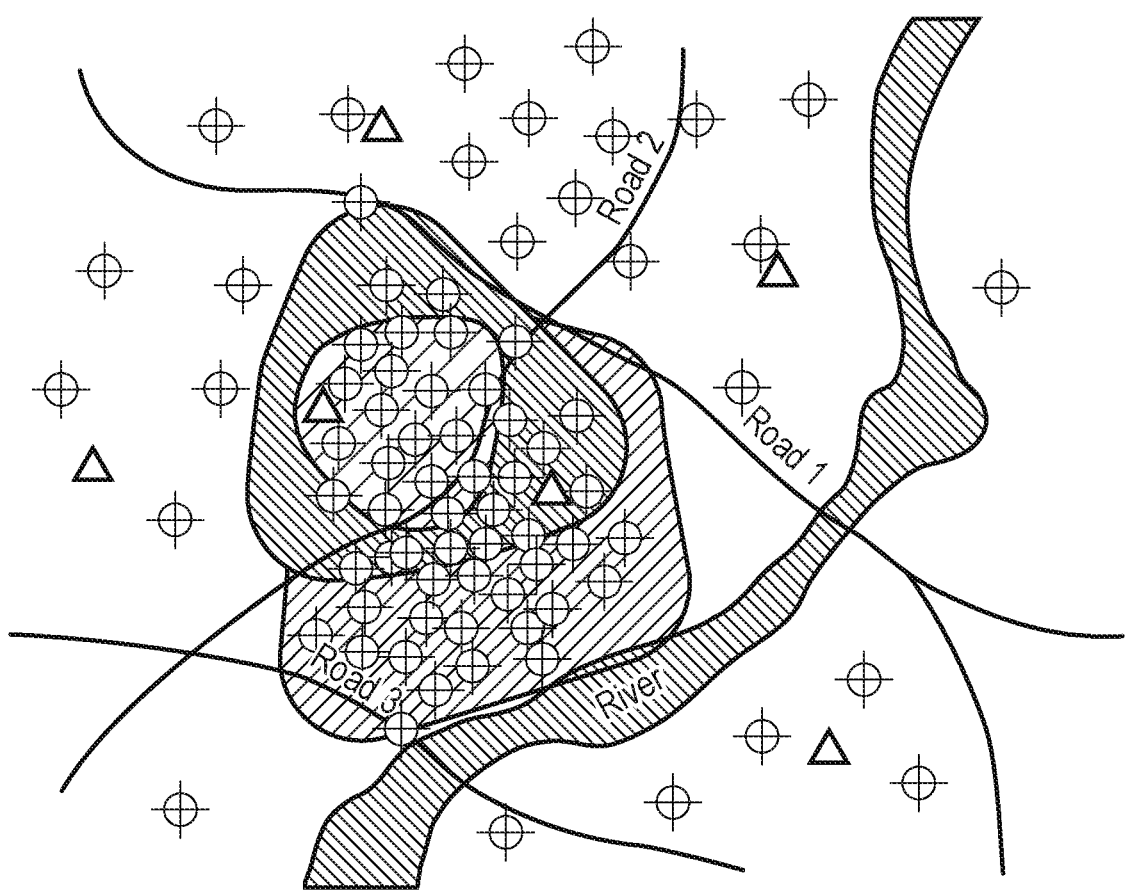
FIG. 12 is a schematic illustration of yet another map of user queries about the performance of a network.

Finally, FIG. 13 again shows the same geographic area as FIGS. 11 and 12. However, in FIG. 13, the overlaid clusters have been amalgamated to produce a heat map of performance query activity over the 28 day period. It is clear from this map which areas of the network are most severely impacted (the crosshatched areas) and consequently it is the base-stations in—or closest to—the crosshatched areas that are most likely to be at fault.

It is possible to group or cluster the performance queries in other ways. For example, groups of query locations could be formed based upon the actual, known or predicted coverage of base stations, thereby forming clusters based upon base station coverage patterns. This contrasts with algorithm 700 which forms clusters of closely-spaced query locations, with no account being taken of whether the query locations are covered by a single, or multiple, base station coverage areas. Given a list of base station coverage areas (e.g. obtained from a planning or coverage prediction tool, or from actual 'drive-test' coverage measurements), it is possible to group performance query locations by base station. Then, if the number of performance queries arising within a given base station's coverage area (in a given time period) exceeded a threshold, it could be reported that there is a potential outage at that base station. An advantage of this approach is that there is then a direct link between user-submitted queries and the base station or stations which are experiencing problems. In the case where the base station coverage areas overlap significantly (as would be the case where the network is a CDMA network), the disadvantage would arise that 'false reports' might arise, for example indicating a problem at the wrong base-station or problems at multiple base-stations when only one base station is actually at fault.

Various embodiments have now been described in the context of monitoring a mobile network. It is possible to apply a system like NSRS 10, NSRS 100 or NSRS 200 to other types of communication networks in which a large number of disparate users rely upon a smaller number of communications 'nodes' in order to receive, amalgamate, route or otherwise process and forward, communications traffic. In this vein, it is possible to apply the invention to a fixed-line data network, such as a 'broadband' internet network (e.g. using DSL or fibre optics or similar). In such a case, the 'nodes', rather than being base stations or cell sites, could be roadside cabinets containing switching or routing equipment or any other equipment which serves a number of users in a given locality. For example, a group of users connected to the same roadside cabinet and who were experiencing poor service, could perform a service check (e.g. using a device connected to a cellular data service) and obtain a similar 'red', 'amber' or 'green' response to a query about their fixed-line service. In this case, poor service could include a poor data speed in the upload direction, the download direction, or both, or it could represent a complete service failure. Again the service checks could be analysed in order to assess whether only a single user is experiencing difficulties, in which case the problem could lie with his/her customer premises equipment (CPE), or whether many users connected to a common point are experiencing difficulties, in which case there is likely to be a fault (or severe congestion) centred on that common point (e.g. street cabinet).

As discussed above, the NSRSs 10, 100 and 200 and their variants are capable of, amongst other things, identifying a network element that is likely faulty. For example, the application of a clustering technique to group user queries about network performance can, as discussed above, determine that a previously unknown fault exists in an area covered by a cluster. That area may be relatively small and include just one base station (which can then be deemed faulty), and the queries in the cluster then attributed to that base station. There are, of course, other ways of attributing queries to base stations. For example, a network performance query may include the location about which the query is being raised, such that the base station that the user is—or should be—using can be determined by querying a coverage database indicating the base station that serves that location. The coverage database could specify for each base station an area measured as the actual coverage zone of the base station or an area estimated to be the coverage zone of the base station. The user's location could be supplied by input through a web form (for example, as a postal code or ZIP code), by telling a customer service representative of the network, or by automatically including the location when raising the query through a smart phone app. As a further example attributing base stations to queries, a mobile telephone will routinely send periodic reports to its serving network, and, when the user of the telephone queries network performance, it may be possible to examine the periodic report closest in time to the query in order to retrieve the identity of the base station to which the telephone was connected at the time of the report, it then being reasonable to assume that the telephone was using that base station when the poor service occurred, and accordingly attribute that query to that base station.

It will thus be apparent that there are many ways to identify a base station as the one that was or was meant to be—serving a user's telephone when the user raised a query about the performance of the network. It will now be described how the NSRSs 10, 100 and 200 and their variants can employ user queries having base station attributions in order to mathematically determine whether or not a network element supporting multiple base stations has failed or is performing poorly.

Before doing so, however, it will be recalled that, in a mobile telecommunications network, some elements are dependent upon other elements in order to function properly. For example, in the case of a 3G network, node-B base stations are organised into groups, each group being controlled by, and therefore dependent upon, a particular RNC. As another example, a group of base stations in a network might depend upon the same piece of backhaul infrastructure, such as a microwave link or a fibre-optic cable, to communicate with the network as a whole. There are therefore various scenarios in almost any communications network where multiple elements depend for their performance upon some other element. An element on which other elements depend can be termed a "parent" element, and the elements that depend upon it can be termed be "child" elements. User queries with base station attributions can be used to assess whether or not base stations' parent elements are at fault. Processing for carrying out such an assessment by an analysis unit of an NSRS (e.g. analysis unit 210 of NSRS 200) will now be described with reference first of all to FIG. 15.

Figure 14:
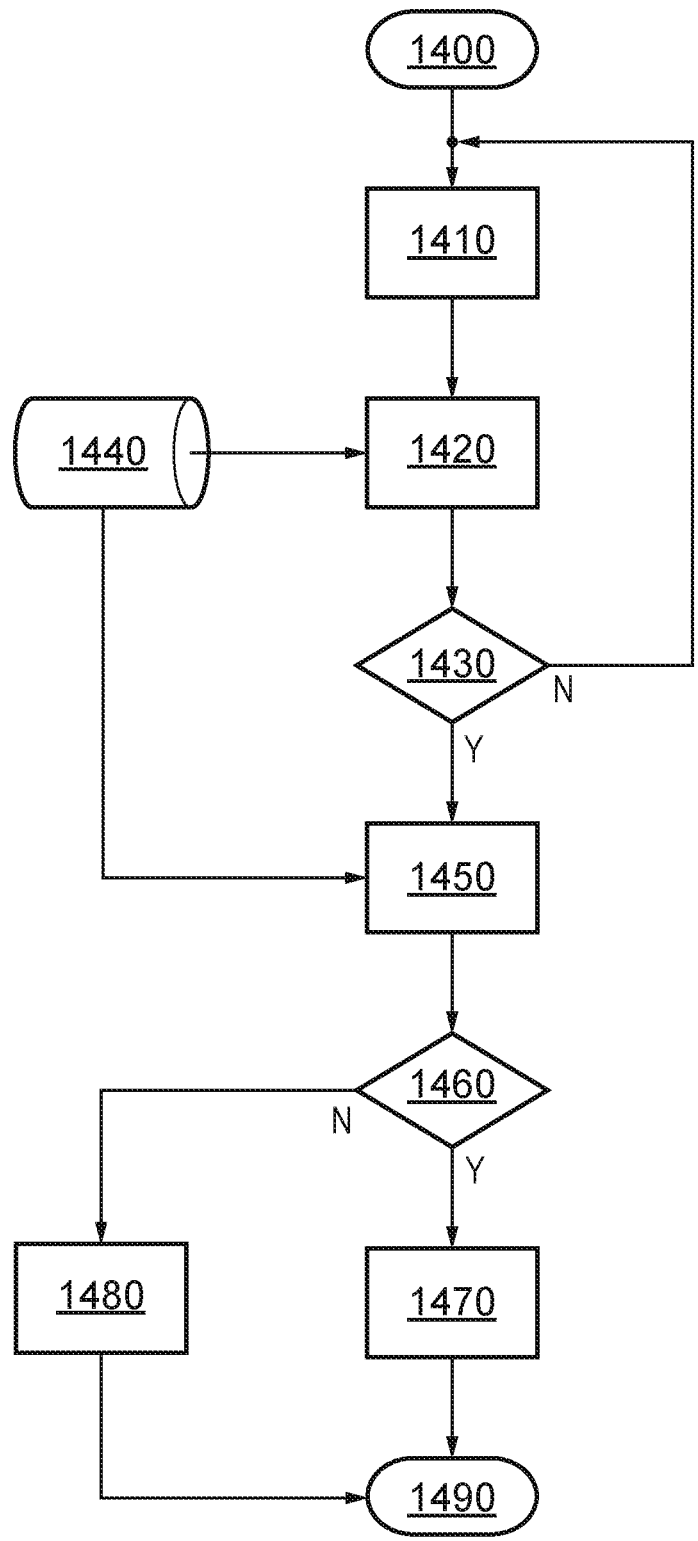
FIG. 14 is a schematic illustration of a computer system for identifying failures in utility supply network equipment upon which multiple other elements in the network depend for their correct operation.
Figure 15:
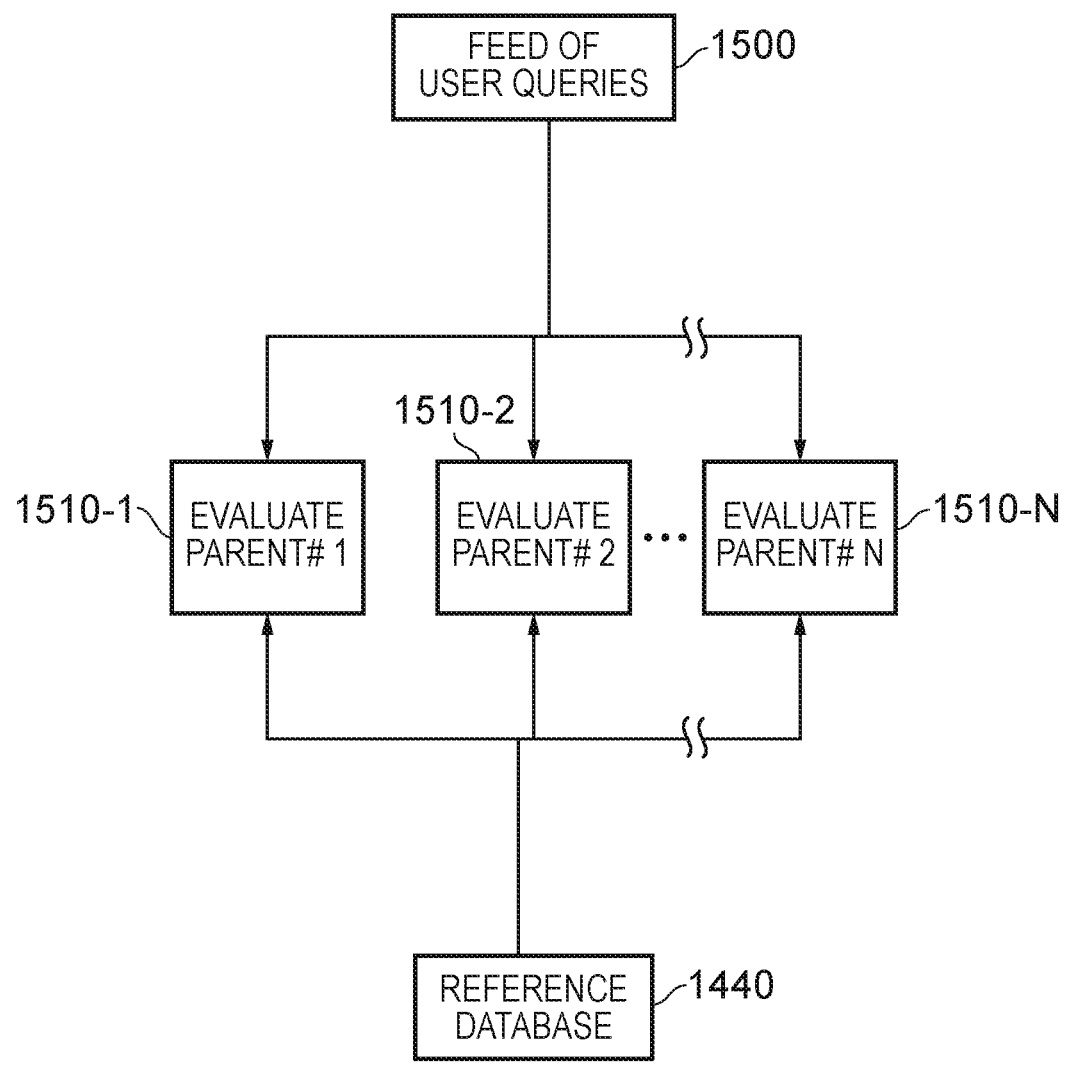
FIG. 15 is higher-level schematic illustration of a computer system for identifying failures in utility supply network equipment upon which multiple other elements in the network depend for their correct operation.

FIG. 15 shows schematically the processing that is conducted within, for the sake of argument, the analysis unit 210 of NSRS 200. The NSRS 200 produces a serial feed 1500 of user network performance queries. In this example, the feed 1500 is a serial stream of user network performance queries, in which the queries issue in the order that they were received from the users. The order is determined from time stamps added to the queries at the point they were received by the NSRS 200. The feed 1500 is used as an input to processes for the evaluation of parent elements in the network. As shown in FIG. 15, the feed 1500 is applied to N separate processes, each for the evaluation of a respective parent element. These processes are labelled 1510-1 to 1510-N in FIG. 15. For reasons that will shortly be explained, the processes 1510-1 to 1510-N also receive input from a reference database 1440 that identifies a number of (or even all of) the parent elements in the network and for each parent element the identity of its child elements. It is perfectly possible, of course, for a child element to depend on multiple parent elements and thus for the same child element to be identified in the database 1440 in the records of several different parent elements. The processes 1510-1 to 1510-N have the same structure and that structure will now be described by reference to FIG. 14.

FIG. 14 shows a flow chart of the processing that takes place in, for the sake of argument, parent evaluation process 1510-1. For the purposes of this discussion, it shall be assumed that the network monitored by NSRS 200 is a 3G telecommunications network, and that process 1510-1 is for assessing whether a particular RNC in the 3G network should be deemed faulty based on user network performance queries about the node-B base stations that the RNC controls. Therefore, the RNC is the parent element and the node-B base stations are the child elements in process 1510-1.

In step 1400, the analysis unit 210 commences the process 1510-1.

In step 1410, the analysis unit 210 obtains a user query about the performance of the network.

In step 1420, the analysis unit 210 determines, by reference to the database 1440, whether the user network performance query is attributed to one of the base stations that is served by the RNC that is under assessment. If the user network performance query is attributed to one of those base stations, then the analysis unit 210 increments by one a count that it maintains of the number of user network performance queries that are attributed to base stations that are served by the RNC that is under assessment in process 1510-1. This count is a running total, $T_{RNC}$, of the user network performance queries that are attributed to the RNC that is under assessment in process 1510-1.

In step 1430, the analysis unit 210 determines whether the running total $T_{RNC}$ exceeds a first threshold, $L_1$. If $T_{RNC}$ does not exceed $L_1$, the analysis unit 210 returns to step 1410. However, if $T_{RNC}$ exceeds $L_1$, the analysis unit 210 proceeds to step 1450.

The analysis unit 210 is provided with a "likelihood condition" for each of the node-B base stations. Some or all of the node-B base stations may be assigned the same likelihood condition. In step 1450, the analysis unit 210 determines, again by reference to the hierarchical dependencies in database 1440, how many of the node-B base stations that are served by the RNC under assessment meet their respective likelihood conditions. For a given node-B base station, its respective likelihood condition is whether the number of user network performance queries attributed to that node-B base station exceeds a threshold number, $L_{nodeB}$. The threshold $L_{nodeB}$ therefore determines the likelihood condition for a given node-B base station, and any node-B base stations having the same $L_{nodeB}$ value have the same likelihood condition.

In step 1460, the analysis unit 210 determines whether the number of node-B base stations determined in step 1450 exceeds a second threshold, $L_2$. If the threshold is exceeded, then the analysis unit 210 proceeds to step 1470; otherwise, the analysis unit proceeds to step 1480.

In step 1470, the analysis unit 210 reports that the RNC under assessment in process 1510-1 is faulty. The analysis unit 210 then proceeds to step 1490.

In step 1480, the analysis unit 210 reports that the node-B base stations that met their respective likelihood conditions are faulty. The analysis unit 210 then proceeds to step 1490.

In step 1490, the process ends.

The reports produced in steps 1470 and 1480 can be used by network operatives or systems to schedule efforts to repair or conduct more detailed investigation of the element or elements that have been reported as faulty. The two-stage determination provided by the tests in steps 1430 and 1460 in order to conclude that the RNC parent element is faulty provides greater certainty than, say, from using the test of step 1430 alone. It will be apparent that there is advantage in increasing the certainty of a fault determination, not least because sub-optimal operation of the network can more easily by avoided but also because the network operator can avoid the waste of resources associated with attempting to rectify what turns out be a non-existent fault.

The processes 1510-2 to 1510-N function in the same way, albeit that they each serve to assess a different parent element in the 3G network. For example, one of processes 1510-2 to 1510-N could have a particular fibre-optic backhaul link as its parent element under assessment. As discussed earlier, some of the processes 1510-1 to 1510-N may have child elements in common. Another point to bear in mind is that while the $L_2$ threshold was described above as an absolute number, it could instead be expressed in relative terms, as a percentage or fraction. That is to say, $L_2$ could be the percentage or fraction of the total number of the child elements that are served by the parent element in question.

Periodically, the analysis unit 210 resets the processes 1510-1 to 1510-N. That is to say, the counts in the processes 1510-1 to 1510-N, including the counts in the likelihood conditions, are reset to zero. This prevents the processes 1510-1 to 1510-N from issuing failure reports that are based on old user network performance queries. The period between resets may be the same for all of the processes 1510-1 to 1510-N, or the processes 1510-1 to 1510-N may have different reset periods.

In another variant of the scheme presented in FIGS. 14 and 15, the potential for a distorting effect arising from basing the counts in processes 1510-1 to 1510-N on aged user network performance queries is addressed by including within the counts only user network performance queries that are more recent than a certain time point (for example, four hours ago). In such a case, the processes 1510-1 to 1510-N are modified to maintain for each total that is to be evaluated a list of the user network performance queries that contribute to the total, and to include within each list entry the time stamp of the respective user network performance query. Then, upon reaching a process step where a total has to be examined, e.g. step 1420, any user network performance queries that are over the age limit are deleted and the count is established based on the list of remaining queries. For the avoidance of doubt, this list-based approach can be used for the count that is used in the sub-step of evaluating whether a particular likelihood condition is met.

With reference to FIGS. 14 and 15, there have been described methods and apparatus for determining when faults in a cellular telephone network are attributable to failure of serving equipment upon which other elements of the network depend for their proper operation, rather than to failure of the dependent elements themselves. Although the examples have been given in the context of a mobile telephone network (specifically, a 3G mobile telephone network), it will be apparent to readers familiar with technology for the supply and delivery of utilities that the invention is readily transferable to the identification of root causes of failure in other forms or generations of mobile telephone network or other utility supply scenarios, such as a water, electricity or gas supply, or the provision of broadband or cable television.

The invention claimed is:

1. A method of fault monitoring in a utility supply network containing a plurality of elements necessary for delivery of a utility, the plurality of elements comprising a first parent element upon which a first plurality of child elements depend and a second parent element upon which a second plurality of child elements depend, the method comprising:
   receiving failure indications at a network service reporting system from network elements of the utility supply network, each failure indication attributed to a child element of the first plurality of child elements and indicating failure of an element in the utility supply network;
   counting, as a first total, a number of failure indications that have been received for the first plurality of child elements;
   determining whether the first total exceeds a first threshold;
   upon determining that the first total exceeds the first threshold:
      counting, as a second total, a number of child elements of the first plurality of child elements that satisfy a likelihood condition;
      determining whether the second total exceeds a second threshold; and
      upon determining that the second total exceeds the second threshold, signaling that the first parent element is likely impaired;
   counting, as a third total, a number of failure indications that have been received for the child elements of the second plurality of child elements;
   determining whether the third total exceeds a third threshold; and
   upon determining that the third total exceeds the third threshold:
      counting, as a fourth total, a number of child elements of the second plurality of child elements that satisfy a likelihood condition;
      determining whether the fourth total exceeds a fourth threshold; and
      upon determining that the fourth total exceeds the fourth threshold, signaling that the second parent element is likely impaired,
   wherein, for each child element of the first plurality of child elements and the second plurality of child elements, the likelihood condition is a count of the failure indications that are attributed to said child element exceeding a limit assigned to said child element.

2. The method of claim 1, wherein determining whether the second total exceeds the second threshold comprises assessing whether more than a certain fraction or percentage of the first plurality of child elements satisfy their likelihood conditions.

3. The method of claim 1, wherein one or more of the child elements are common to the first and second pluralities of child elements.

4. The method of claim 1, wherein some or all of the likelihood conditions are the same.

5. The method of claim 1, wherein at least one failure indication is a query from a user about unsatisfactory network performance.

6. The method of claim 5, further comprising attributing a query from a user to a particular child element at least in part by estimating that the user relied on the particular child element when receiving the unsatisfactory network performance.

7. The method of claim 5, further comprising attributing a query from a user to a particular child element at least in part by estimating that the user should have relied on the particular child element when receiving the unsatisfactory network performance.

8. The method of claim 5, further comprising attributing a query from a user to a particular child element at least in part by estimating that the user was located within a predicted, measured or estimated coverage area of the particular child element when receiving the unsatisfactory network performance.

9. The method of claim 5, further comprising attributing a query from a user to a particular child element at least in part by reviewing logged information to establish that the user relied on the particular child element when receiving the unsatisfactory network performance.

10. An apparatus for fault monitoring in a utility supply network containing a first parent element upon which a first plurality of child elements and a second parent element upon which a second plurality of child elements depend for delivery of a utility, the apparatus comprising:
   one or more processors; and
   a non-transitory, processor-readable storage medium comprising instructions thereon that, when executed by the one or more processors, cause the one or more processors to:
      receive failure indications from network elements of the utility supply network, each failure indication attributed to a particular child element and indicating failure of an element in the utility supply network;
      count, as a first total, a number of failure indications that have been received for the first plurality of child elements;
      determine whether the first total exceeds a first threshold; and
      upon determining that the first total exceeds the first threshold:
         count, as a second total, a number of child elements of the first plurality of child elements that satisfy a likelihood condition;
         determine whether the second total exceeds a second threshold;
         upon determining that the second total exceeds the second threshold, signal that the first parent element is likely impaired;
      count, as a third total, a number of failure indications that have been received for the child elements of the second plurality of child elements;

determine whether the third total exceeds a third threshold; and upon determining that the third total exceeds the third threshold:
  count, as a fourth total, a number of child elements of the second plurality of child elements that satisfy a likelihood condition;
  determine whether the fourth total exceeds a fourth threshold; and
  upon determining that the fourth total exceeds the fourth threshold, signal that the second parent element is likely impaired;
wherein at least the first and second totals are stored in data storage hardware; and
for each child element of the first plurality of child elements and the second plurality of child elements, the likelihood condition is a count of the failure indications that are attributed to said child element exceeding a limit assigned to said child element.

11. The apparatus of claim 10, wherein determining whether the second total exceeds the second threshold comprises assessing whether more than a certain fraction or percentage of the first plurality of child elements satisfy their likelihood conditions.

12. The apparatus of claim 10, wherein one or some of the child elements are common to the first and second pluralities of child elements.

13. The apparatus of claim 10, wherein some or all of the likelihood conditions are the same.

14. The apparatus of claim 10, wherein at least one failure indication is a query from a user about unsatisfactory network performance.

15. The apparatus of claim 14, wherein the instructions, when executed by the one or more processors, further cause the one or more processors to attribute a query from a user to a particular child element at least in part by estimating that the user relied on that child element when receiving the unsatisfactory network performance.

16. The apparatus of claim 14, wherein the instructions, when executed by the one or more processors, further cause the one or more processors to attribute a query from a user to a particular child element at least in part by estimating that the user should have relied on the particular child element when receiving the unsatisfactory network performance.

17. The apparatus of claim 14, wherein the instructions, when executed by the one or more processors, further cause the one or more processors to attribute a query from a user to a particular child element at least in part by estimating that the user was located within a predicted, measured or estimated coverage area of the particular child element when receiving the unsatisfactory network performance.

18. The apparatus of claim 14, wherein the instructions, when executed by the one or more processors, further cause the one or more processors to attribute a query from a user to a particular child element at least in part by reviewing logged information to establish that the user relied on the particular child element when receiving the unsatisfactory network performance.

* * * * *